(12) United States Patent
Kim et al.

(10) Patent No.: US 12,542,164 B2
(45) Date of Patent: Feb. 3, 2026

(54) MEMORY DEVICE INCLUDING MULTI-BIT CELL AND OPERATING METHOD THEREOF

(71) Applicant: Samsung Electronics Co., Ltd., Suwon-si (KR)

(72) Inventors: Duhwi Kim, Suwon-si (KR); Junghak Song, Suwon-si (KR); Chanho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 201 days.

(21) Appl. No.: 18/124,094

(22) Filed: Mar. 21, 2023

(65) Prior Publication Data

US 2023/0352068 A1 Nov. 2, 2023

(30) Foreign Application Priority Data

Apr. 27, 2022 (KR) .......................... 10-2022-0052232

(51) Int. Cl.
*G11C 7/10* (2006.01)
*G11C 8/08* (2006.01)

(52) U.S. Cl.
CPC .......... *G11C 7/1096* (2013.01); *G11C 7/1069* (2013.01); *G11C 7/1087* (2013.01); *G11C 8/08* (2013.01)

(58) Field of Classification Search
CPC ................ G11C 7/1096; G11C 7/1069; G11C 7/1087; G11C 8/08

(Continued)

(56) References Cited

U.S. PATENT DOCUMENTS 6,188,594 B1 2/2001 Ong
6,301,322 B1 * 10/2001 Manning ................ G11C 19/28
365/240

(Continued)

FOREIGN PATENT DOCUMENTS

KR 101161506 B1 6/2012

OTHER PUBLICATIONS

Fujiwara et al., "24.4 A 5nm 5.7GHz@1.0V and 1.3GHz@0.5V 4kb Standard-Cell-Based Two-Port Register File with a 16T Bitcell with No Half-Selection Issue," 2021 IEEE International Solid-State Circuits Conference (ISSCC), 2021, pp. 1-3.

(Continued)

*Primary Examiner* — Amir Zarabian
*Assistant Examiner* — Daniel J King
(74) *Attorney, Agent, or Firm* — Muir Patent Law, PLLC

(57) ABSTRACT

A memory device includes a plurality of multi-bit cells, wherein each of the plurality of multi-bit cells includes a plurality of bit cells commonly connected to a column selection line, respectively connected to a plurality of write word lines, and respectively connected to a plurality of read word lines and an input circuit configured to provide a first signal corresponding to a bit to be written, to the plurality of bit cells, wherein each of the plurality of bit cells includes a latch circuit configured to receive the first signal in response to a write word line being activated and latch the first signal in response to the write word line being deactivated or a column selection line being deactivated, and a read circuit configured to output the first signal stored in the latch circuit to a bit line in response to a read word line being activated.

20 Claims, 24 Drawing Sheets

(58) Field of Classification Search
USPC .................................................. 365/189.011
See application file for complete search history.

(56) References Cited

U.S. PATENT DOCUMENTS

| | | | |
|---|---|---|---|
| 8,144,540 | B2 | 3/2012 | Liaw |
| 8,363,454 | B2* | 1/2013 | Wang .................... G11C 11/412 |
| | | | 365/63 |
| 8,675,397 | B2 | 3/2014 | Liaw |
| 8,958,254 | B2 | 2/2015 | Joshi et al. |
| 2001/0050866 | A1 | 12/2001 | Khieu |
| 2003/0002334 | A1* | 1/2003 | Ho Chang .......... G11C 11/5628 |
| | | | 365/185.03 |
| 2003/0043653 | A1* | 3/2003 | Kuroda .................... G11C 7/22 |
| | | | 365/200 |
| 2009/0147592 | A1 | 6/2009 | Joshi et al. |
| 2012/0195111 | A1 | 8/2012 | Ramaraju |
| 2012/0327704 | A1 | 12/2012 | Chan et al. |
| 2016/0035414 | A1 | 2/2016 | Ngo et al. |
| 2020/0020386 | A1* | 1/2020 | Yu ......................... G11C 11/419 |
| 2021/0124578 | A1* | 4/2021 | Yamazaki ........... G11C 11/4085 |

OTHER PUBLICATIONS

Sinangil et. al, "A 290MV Ultra-Low Voltage One-Port SRAM Compiler Design Using a 12T Write Contention and Read Upset Free Bit-Cell in 7NM FinFET Technology," 2018 IEEE Symposium on VLSI Circuits, 2018, pp. 13-14.

* cited by examiner

FIG. 3C

| Row (WWL/WWLB) | Column (CS/CSB) | Input Data | Input Signals ||||||| SRAM Data |
| --- | --- | --- | --- | --- | --- | --- | --- | --- | --- |
| | | | WWL | WWLB | CS | CSB | D1B | D0 | NODE c |
| Unselected | Unselected | 0 | 0 | 1 | 0 | 1 | 1 | 0 | Previous state |
| | | 1 | 0 | 1 | 0 | 1 | 1 | 0 | Previous state |
| | Selected | 0 | 0 | 1 | 1 | 0 | 1 | 1 | Previous state |
| | | 1 | 0 | 1 | 1 | 0 | 0 | 0 | Previous state |
| Selected | Unselected | 0 | 1 | 0 | 0 | 1 | 1 | 0 | Previous state |
| | | 1 | 1 | 0 | 0 | 1 | 1 | 0 | Previous state |
| | Selected | 0 | 1 | 0 | 1 | 0 | 1 | 1 | 0 |
| | | 1 | 1 | 0 | 1 | 0 | 0 | 0 | 1 |

FIG. 3D

| Row (RWL/RWLB) | SRAM Data (NODE c) | Input Signals | | Output Data | |
|---|---|---|---|---|---|
| | | RWL | RWLB | NODE c | RBL |
| Unselected | 0 | 0 | 1 | 0 | Hi-Z or 1 or 0 |
| Unselected | 1 | 0 | 1 | 1 | Hi-Z or 1 or 0 |
| Selected | 0 | 1 | 0 | 0 | 0 |
| Selected | 1 | 1 | 0 | 1 | 1 |

FIG. 7B

| BWEB | WYB | D | CS | CSB | D1B | D0 |
|------|-----|---|----|----|-----|----|
| 0 | 0 | 0 | 1 | 0 | 1 | 1 |
| 0 | 0 | 1 | 1 | 0 | 0 | 0 |
| 0 | 1 | 0 | 0 | 1 | 1 | 0 |
| 0 | 1 | 1 | 0 | 1 | 1 | 0 |
| 1 | 0 | 0 | 0 | 1 | 1 | 0 |
| 1 | 0 | 1 | 0 | 1 | 1 | 0 |
| 1 | 1 | 0 | 0 | 1 | 1 | 0 |
| 1 | 1 | 1 | 0 | 1 | 1 | 0 |

MEMORY DEVICE INCLUDING MULTI-BIT CELL AND OPERATING METHOD THEREOF

CROSS-REFERENCE TO RELATED APPLICATION(S)

This application is based on and claims priority under 35 U.S.C. § 119 to Korean Patent Application No. 10-2022-0052232, filed on Apr. 27, 2022, in the Korean Intellectual Property Office, the disclosure of which is incorporated by reference herein in its entirety.

BACKGROUND

The inventive concept relates to a memory device including a multi-bit cell and an operating method thereof.

Volatile memory devices may include dynamic random access memory (DRAM), static random access memory (SRAM), or the like. For example, SRAM may include cells having a 6T or 8T structure implemented with six or eight transistors. However, data flip may occur in a similar read operation called a half-selected problem in a write operation of SRAM. Therefore, it is desired that the half-selected problem is prevented in SRAM.

SUMMARY

The inventive concept provides a structure of a multi-bit cell capable of preventing a half-selected problem (or a half-selection issue).

According to an aspect of the inventive concept, a memory device may include a memory cell array including a plurality of multi-bit cells, wherein each of the plurality of multi-bit cells includes a plurality of bit cells commonly connected to a column selection line, respectively connected to a plurality of write word lines, and respectively connected to a plurality of read word lines, and an input circuit configured to receive data input signals and provide a first signal corresponding to a bit to be written in each of the plurality of bit cells, to the plurality of bit cells in response to the data input signals, wherein each of the plurality of bit cells includes a latch circuit configured to receive the first signal in response to a write word line being activated, and latch the first signal in response to the write word line being deactivated or a column selection line being deactivated, and a read circuit configured to output a second signal corresponding to a bit stored in the latch circuit to a bit line in response to a read word line being activated.

According to another aspect of the inventive concept, a memory device may include a memory cell array including a plurality of multi-bit cells, wherein each of the plurality of multi-bit cells includes an input circuit and a plurality of bit cells connected to an output terminal of the input circuit, wherein each of the plurality of bit cells includes a first transfer gate connected to the output terminal of the input circuit and configured to receive a first data te from the input circuit, an inverter latch circuit including a first inverter and a second inverter connected to each other, and the inverter latch circuit configured to receive the first data from the first transfer gate and latch the first data, and second and third transfer gates respectively connected between an input terminal of the first inverter and an output terminal of the second inverter. The latch circuit is configured to latch the first data when the second transfer gate or the third transfer gate is turned on.

According to another aspect of the inventive concept, an operating method of a memory device including a plurality of bit cells each connected to a write word line and a column selection line, may include providing a first data to each of the plurality of bit cells from an input circuit, turning on a first transfer gate connected between an output terminal of the input circuit and an input terminal of a latch circuit, and turning off a second transfer gate connected between the input terminal and an output terminal of the latch circuit, in response to the write word line being activated, storing the first data in the latch circuit by turning on the first transfer gate, turning on the second transfer gate in response to the write word line being deactivated, turning off a third transfer gate connected between the input terminal and the output terminal of the latch circuit in response to the column selection line being activated, and turning on the third transfer gate in response to the column selection line being deactivated, and latching the first data in the latch circuit by turning on the second transfer gate or turning on the third transfer gate.

BRIEF DESCRIPTION OF THE DRAWINGS

Embodiments of the inventive concept will be more clearly understood from the following detailed description taken in conjunction with the accompanying drawings in which:

FIG. 3C illustrates a truth table in a write mode of a memory device according to an embodiment;

FIG. 3D illustrates a truth table in a read mode of a memory device according to an embodiment;

FIG. 7B is a truth table of a write driver of FIG. 7A according to an embodiment;

DETAILED DESCRIPTION OF THE EMBODIMENTS

Hereinafter, various embodiments of the inventive concept are described with reference to the accompanying drawings.

Figure 1:
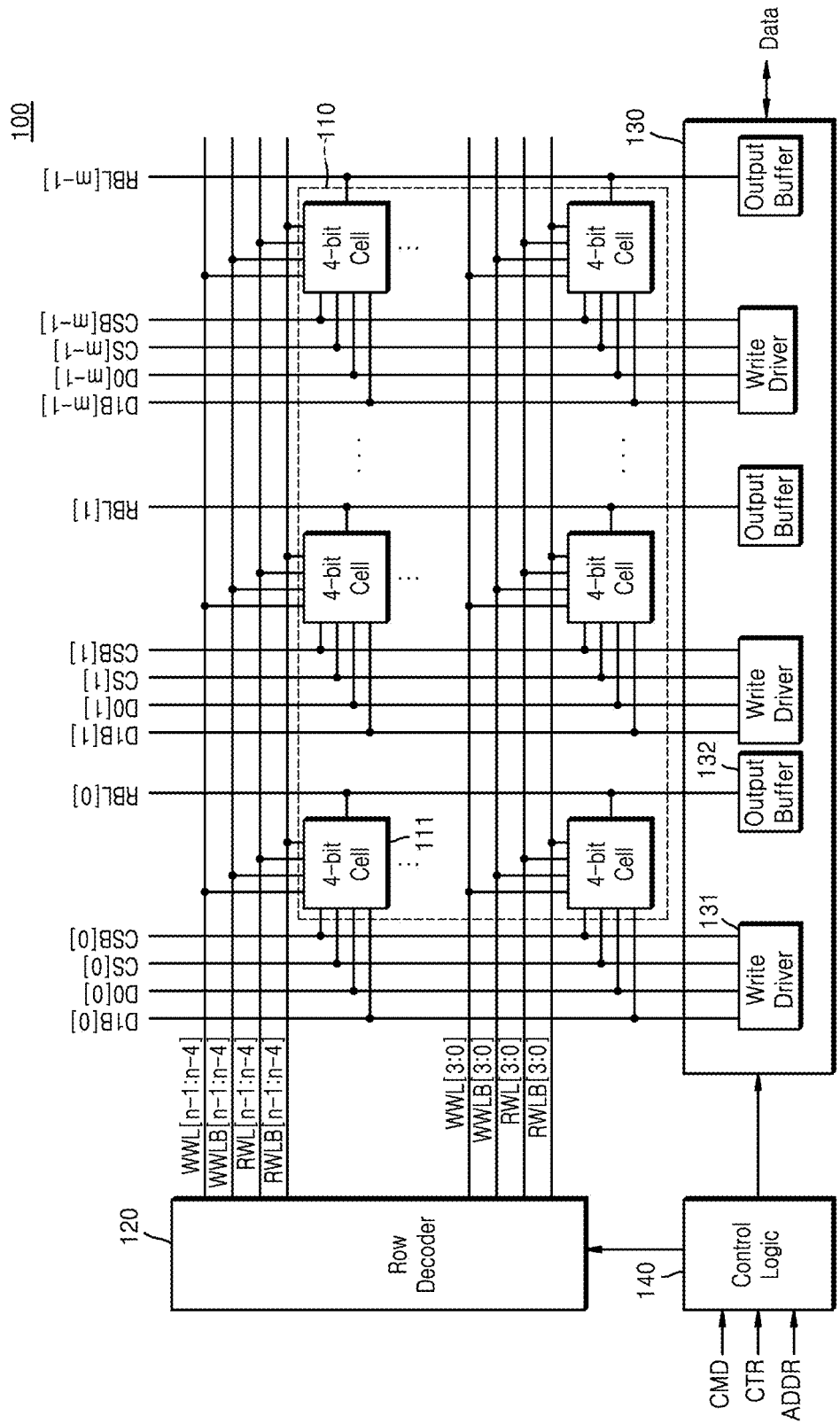
FIG. 1 is a block diagram of a memory device according to an embodiment.

FIG. 1 is a block diagram of a memory device 100 according to an embodiment.

Referring to FIG. 1, the memory device 100 may include a memory cell array 110, a row decoder 120, a page buffer 130, and a control logic circuit 140.

The memory cell array 110 may include a plurality of multi-bit cells 111. The multi-bit cells 111 may be respectively connected to a plurality of differential write word lines WWL and WWLB, a plurality of differential read word lines RWL and RWLB, a plurality of data input lines D1B and D0 (or first and second data input lines D1B and D0), a plurality of differential column selection lines CS and CSB, and a plurality of read bit lines RBL.

Here, each of the differential write word lines WWL and WWLB may include a pair of write word lines WWL[n−1:0] and complementary write word lines WWLB[n−1:0]. Each of the differential read word lines RWL and RWLB may include a pair of read word lines RWL[n−1:0] and complementary read word lines RWLB[n−1:0]. Each of the plurality of data input lines D1B[m−1:0] and D0[m−1:0] may include a pair of data input lines D1B[m−1:0] and D0[m−1:0]. Each of the differential column selection lines CS and CSB may include a pair of column selection lines CS[m−1:0] and complementary column selection lines CSB[m−1:0]. In this case, n and m may be natural numbers equal to or greater than 2. A connection relationship between the multi-bit cell 111 and the pairs of write word lines (WWL[n−1:n−4] and WWLB[n−1:n−4]), the pairs of read word lines (RWL[n−1:n−4] and RWLB[n−1:n−4]), the pairs of column selection lines (CS[m−1:0] and CSB[m−1:0]), and the pairs of data input lines D1B[m−1:0] and D0[m−1:0] is described below with reference to FIGS. 3A to 3B.

The multi-bit cell 111 may be operated by signals from the write word line WWL, the read word line RWL, and the column selection line CS. The multi-bit cell 111 may receive data signals from the data input lines D1B and D0. The multi-bit cell 111 may output data stored therein to the read bit line RBL. The multi-bit cell 111 may include a plurality of bit cells (not shown). For example the multi-bit cell 111 may include four bit cells indicated as a 4-bit cell. In the multi-bit cell 111, a column selection signal and a data input signal may be input separately, which may be advantageous in terms of the half-selected problem. A structure and operation principle of the multi-bit cell 111 are described below with reference to FIGS. 3A to 3K.

The row decoder 120 may decode a row address and select a corresponding one pair of the write word lines WWL and WWLB, or a corresponding one pair of the read word lines RWL and RWLB according to a decoding result. During a write operation, the row decoder 120 may supply a word line voltage at a high level 'H' to any one word line selected by the row address. In addition, the row decoder 120 may supply a word line voltage at a low level 'L' to the word lines unselected by the row address.

The page buffer 130 may decode a column address and select at least one of the multi-bit cells 111 according to a decoding result. During a write operation, the page buffer 130 may apply an input external data signal D to the selected multi-bit cells of the memory cell array 110 under control by the control logic circuit 140. The page buffer 130 may output a signal corresponding to data to be written into the memory cell array 110 through the data input lines D0 and D1B. The page buffer 130 may include a write driver 131 and an output buffer 132. The write driver 131 may provide a signal corresponding to write data to a data input line that is a line extending in a column direction of the multi-bit cell 111 during the write operation. An example of a specific structure of the write driver 131 is described below with reference to FIG. 7A. The output buffer 132 may store data output from the multi-bit cell 111.

The control logic circuit 140 may control the overall operation of the memory device 100, based on a command CMD, an address ADDR, a control signal CTR, etc. input from the outside. During the write operation, the control logic circuit 140 may control various peripheral circuits (not shown), including the page buffer 130, to write data to the selected bit cell. The control logic circuit 140 may output various control signals in response to the command CMD and/or the address ADDR from a memory interface circuit (not shown). For example, the control logic circuit 140 may output a voltage control signal, a row address, a column address, and the like.

Figure 2:
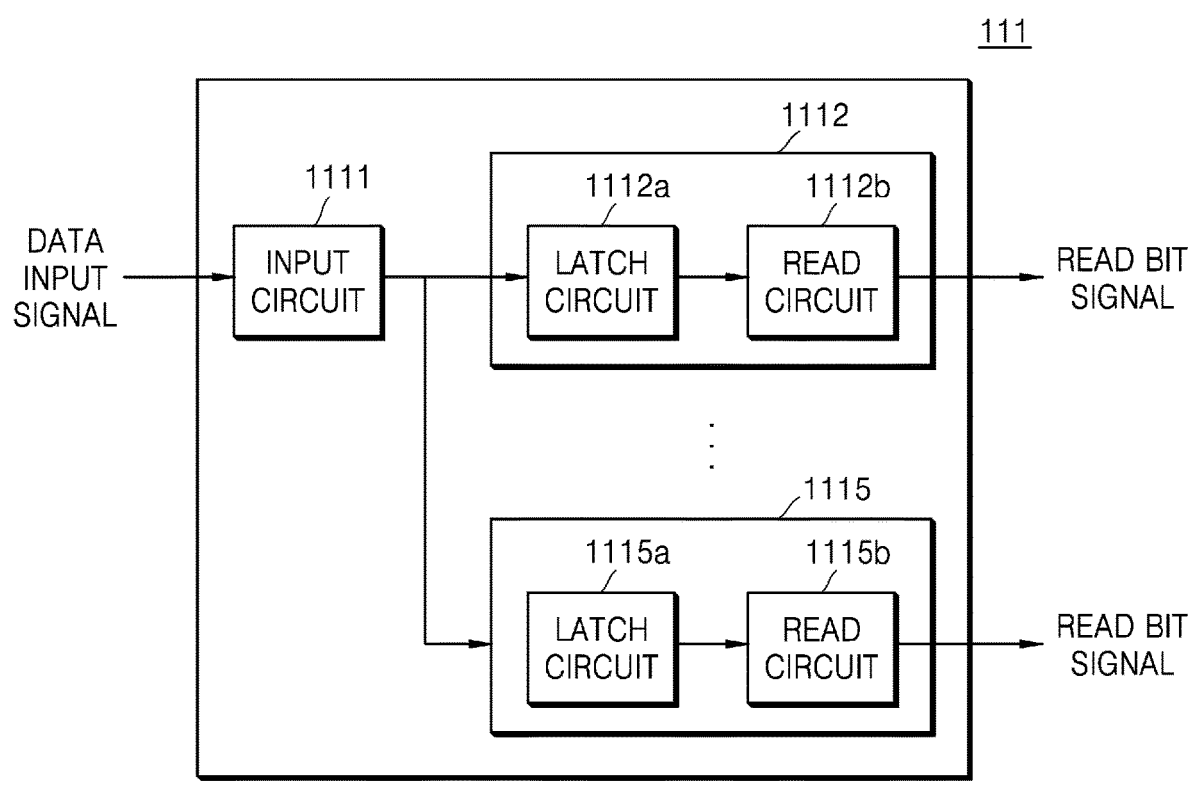
FIG. 2 is a block diagram of a multi-bit cell according to an embodiment.

FIG. 2 is a block diagram of a multi-bit cell 111 according to an embodiment.

Referring to FIG. 2, the multi-bit cell 111 may include an input circuit 1111 and a plurality of bit cells 1112 and 1115. As illustrated in FIG. 2, one multi-bit cell 111 may include one input circuit 1111. The number of bit cells 1112 and 1115 included in one multi-bit cell 111 may be an even number. According to an embodiment, the number of bit cells included in one multi-bit cell 111 may be 4. According to embodiments to be described below, an example in which the number of bit cells included in one multi-bit cell 111 is 2 or 4 is illustrated, but the number of bit cells that the multi-bit cell 111 may include is not limited thereto.

Referring to FIG. 2, the bit cells 1112 and 1115 may include latch circuits 1112a and 1115a and read circuits 1112b and 1115b, respectively.

The latch circuit 1112a and the read circuit 1112b included in the bit cell 1112 may be connected to each other. The bit cells 1112 and 1115 may share one input circuit 1111. The input circuit 1111 in the multi-bit cell 111 may be connected to both the bit cells 1112 and 1115. The input circuit 1111 in the multi-bit cell 111 may apply the same data input signal to the bit cells 1112 and 1115.

According to an embodiment, the latch circuit 1112a may receive a data input signal in response to an activated write word line, latch the received data input signal in response to a deactivated write word line, and enable the latch circuit in response to a deactivated column selection line. The read circuit 1112b may output a read bit signal corresponding to a bit stored in the latch circuit 1112a, in response to the activated read word line.

A detailed configuration of the input circuit 1111, the latch circuits 1112a and 1115a, and the read circuits 1112b and 1115b of FIG. 2 is described in more detail with reference to the circuit diagram of FIG. 3A below.

Hereinafter, a multi-bit cell is expressed as an n-bit cell according to the number of bit cells included in the multi-bit cell according to the inventive concept. According to an embodiment, a multi-bit cell including four bit cells is indicated as a 4-bit cell. According to an embodiment, a multi-bit cell including two bit cells is indicated as a 2-bit cell. Also, the expression 14.5T may mean that the number of transistors included in one bit cell, among a plurality of bit cells included in the multi-bit cell, is 14.5.

According to the inventive concept, the memory device 100 capable of preventing a half-selected problem may be provided. According to the inventive concept, a low area may be implemented by minimizing the number of complementary metal-oxide-semiconductor (CMOS) devices used per bit, among a plurality of bit cells included in the multi-bit cell 111. The memory device 100 according to the inventive concept may perform a column selection operation with signals of the differential column selection lines CS and CSB, and the write driver may be configured such that the signals of the data input lines D1B and D0 are only responsible for data transfer.

Figure 3A:
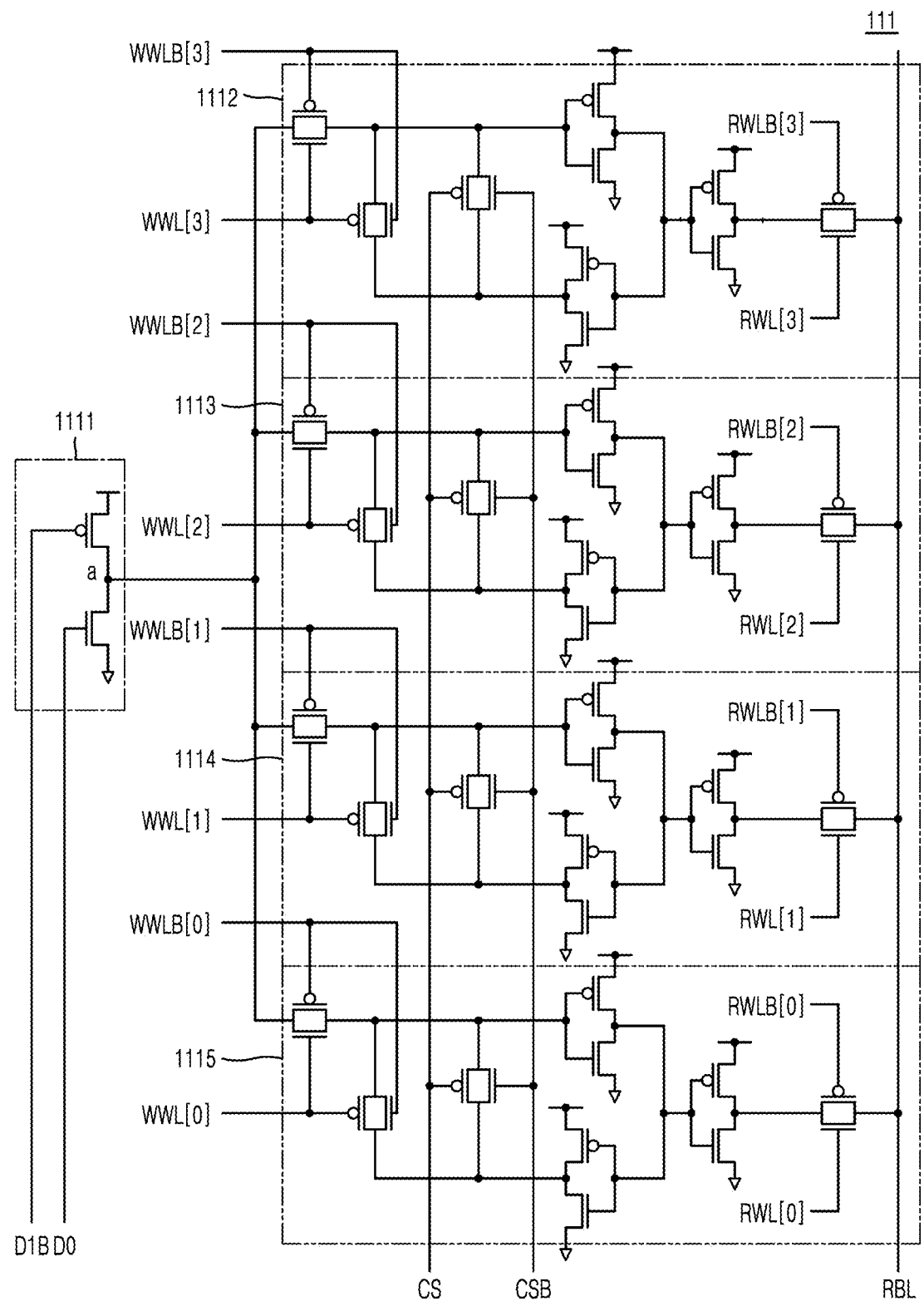
FIG. 3A is a circuit diagram of a 4-bit cell according to an embodiment.

FIG. 3A is a circuit diagram of a 4-bit cell according to an embodiment.

Referring to FIG. 3A, a 14.5T memory cell according to an embodiment is illustrated. Referring to FIG. 3A, the multi-bit cell 111 in which four different bit cells 1112, 1113, 1114, and 1115 share an input circuit 1111 with each other through a node a is illustrated. Referring to FIG. 3A, the number of transistors included in each of the four different bit cells 1112 to 1115 is 14, and the number of transistors included in the input circuit 1111 shared by the four different bit cells 1112 to 1115 is 2. Accordingly, the multi-bit cell 111 illustrated in FIG. 3A may include four bit cells 1112 to 1115, and the number of devices to be used per bit, among the bit cells 1112 to 1115 included in the multi-bit cell 111 is 14.5, thereby implementing a low area and at the same time supplementing a half-selected problem.

In 6T or 8T SRAM, data flip may be occurred in a similar read operation called a half-selected problem in a write operation. The half-selected problem is that unselected bit cells which use the same word line as bit cells selected in a write mode may affect stored data as an internal node of the unselected bit cells is connected to a bit line and a complementary bit line simultaneously when the word line is activated. In addition, in the case of inputting data to the selected bit cell, if data opposite to the data stored in the SRAM is input to the selected bit cell, data fighting occurs, resulting in large current consumption. The 14.5T SRAM according to an embodiment has the effect of supplementing the half-selected problem by separating the column selection line from the data input line.

Referring back to FIG. 3A, the lines connected to the bit cell 1112 may include a pair of write word lines (WWL[3] and WWLB[3]), a pair of read word lines (RWLB[3] and RWL[3]), a pair of column selection lines (CS and CSB), and data input lines D1B and D0. An output of the multi-bit cell 111 may be connected to the read bit line RBL. According to an embodiment, the write word line, the read word line, and the column selection line that are lines connected to one bit cell 1112 may all be provided in pairs.

In a row direction of the multi-bit cell 111, a pair of write word lines (WWL[3:0] and WWLB[3:0]) and a pair of read word lines (RWL[3:0] and RWLB[3:0]) may be connected to a corresponding one of the bit cells 1112 to 1115. In a column direction of the multi-bit cell 111, one pair of column selection lines (CS and CSB), the data input lines D1B and D0, and the read bit line RBL may be connected to the multi-bit cell 111. According to an embodiment of FIG. 3A, a multi-bit cell 111 including four bit cells 1112 to 1115 is illustrated, so that a total of four pairs of write word lines (WWL[0:3] and WWLB[0:3]) may be illustrated and a total of four pairs of read word lines (RWL[0:3] and RWLB [0:3]) may be illustrated. The multi-bit cell 111 may include a plurality of devices determined to be turned on or off according to signals applied to a pair of write word lines, a pair of read word lines, and a pair of column selection lines.

Figure 3B:
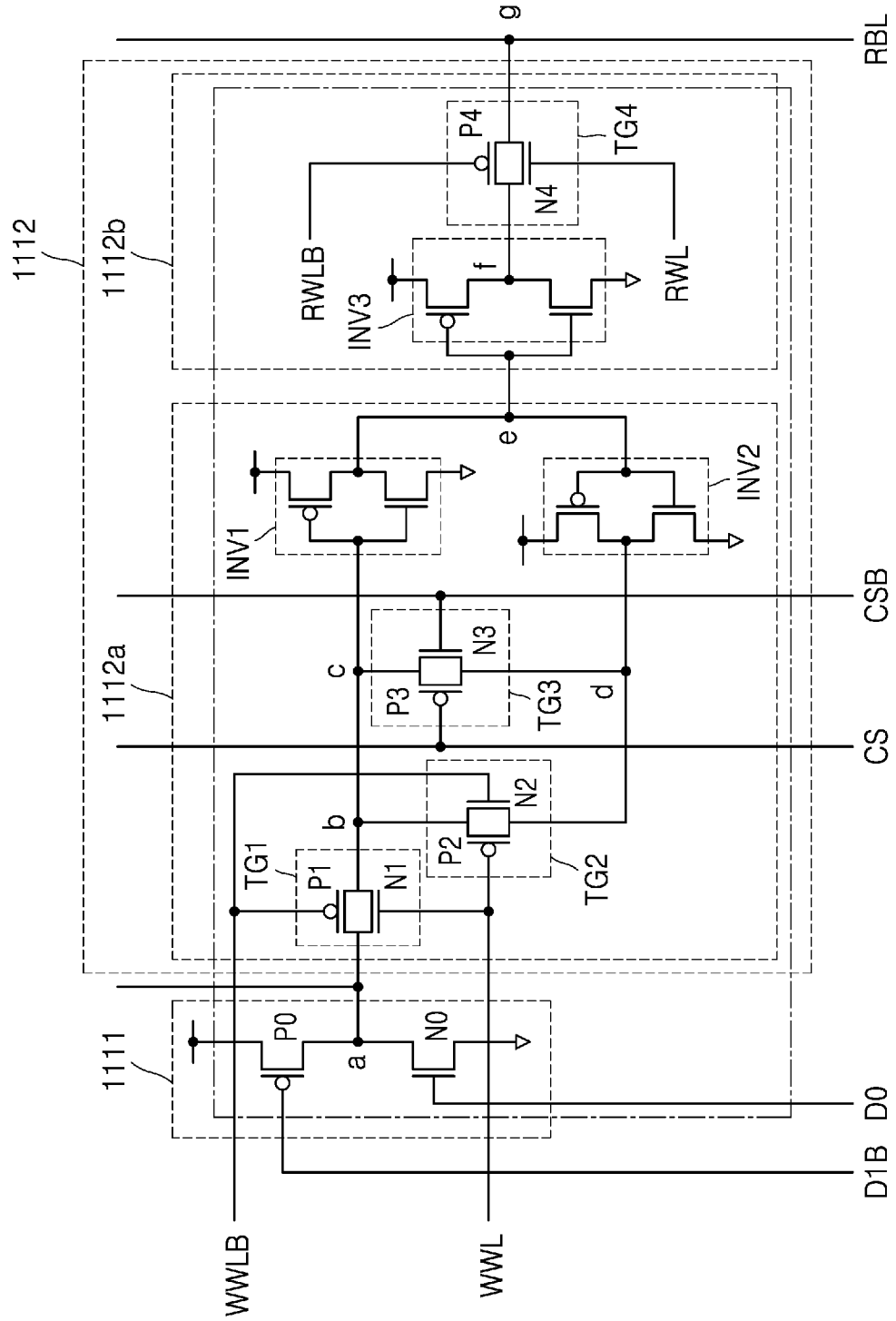
FIG. 3B is a circuit diagram illustrating one bit cell of the 4-bit cell of FIG. 3A according to an embodiment.

FIG. 3B is a circuit diagram illustrating one bit cell of the 4-bit cell of FIG. 3A according to an embodiment.

Referring to FIG. 3B, one (i.e., the bit cell 1112) of the 4-bit cell of FIG. 3A and the input circuit 1111 connected to the bit cell 1112 are illustrated.

Referring to FIG. 3B, in the bit cell 1112, a pair of write word lines (WWL and WWLB) and a pair of read word lines (RWL and RWLB) may be connected in the row direction. In the bit cell 1112, the data input lines D1B and D0 and a pair of the column selection lines (CS and CSB) may be connected in the column direction. A read bit line RBL, which is an output signal of data, may be connected to an output of the bit cell 1112.

Hereinafter, activation of the write word line may refer to a case in which 1 is input to the write word line WWL, among the pair of write word lines (WWL and WWLB), and 0 is input to the complementary write word line WWLB. Activation of the read word line may refer to a case in which 1 is input to the read word line RWL among the pair of read word lines (RWL and RWLB) and 0 is input to the complementary read word line RWLB. Activation of the pair of column selection lines (CS and CSB) may refer to a case in which 1 is input to the column selection line CS and 0 is input to the complementary column selection line CSB.

According to an embodiment, inputting of 1 to the write word line WWL may mean that a word line voltage applied to the write word line WWL has a high level "H". Inputting of 0 to the write word line WWL may mean that the word line voltage applied to the write word line WWL has a low level "L". This may be equally applied to the read word line and the column selection line.

Referring back to FIG. 3B, the input circuit 1111 may be connected to the data input lines D1B and D0. The input circuit 1111 may include a first P-channel metal-oxide-semiconductor (PMOS) transistor P0 and a first N-channel metal-oxide semiconductor (NMOS) transistor N0. The first PMOS transistor P0 may be connected to the first NMOS transistor N0 in series. Data input lines D1B and D0 may be connected to a gate of the first PMOS transistor P0 and a gate of the first NMOS transistor N0, respectively. According to an embodiment, the first data input line D1B may be connected to the gate of the first PMOS transistor P0. The second data input line D0 may be connected to the gate of the first NMOS transistor N0. Outputs of the input circuit 1111 in response to the signal of the first data input line D1B and the signal of the second data input line D0 may be opposite to each other.

The first PMOS transistor P0 may supply a power supply voltage (VDD) and the first NMOS transistor N0 may supply a ground voltage (0 V) to the latch circuit 1112a during a write operation. According to an embodiment, when the first PMOS transistor P0 is enabled, VDD may be supplied to the latch circuit 1112a. For example, VDD may be supplied to an input terminal of the latch circuit 1112a when the first PMOS transistor P0 is enabled. According to an embodiment, when the first NMOS transistor N0 is enabled, 0 V may be supplied to the latch circuit 1112a. For example, 0 V may be supplied to the input terminal of the latch circuit 1112a when the first NMOS transistor N0 is enabled.

The latch circuit 1112a may include first transfer gates P1 and N1 (or a first transfer gate TG1), second transfer gates P2 and N2 (or a second transfer gate TG2), third transfer gates P3 and N3 (or a third transfer gate TG3), a first inverter INV1, and a second inverter INV2. The latch circuit 1112a may be connected to the node a, which is an output terminal of the input circuit 1111. The first transfer gates P1 and N1 may be connected to an output terminal of the input circuit 1111. The first transfer gates P1 and N1 may transfer an output from the input circuit 1111 to a node b. The first transfer gates P1 and N1 may be connected to the pair of write word lines (WWL and WWLB), and may be turned on or off according to whether the write word line WWL is activated. When the write word line WWL is activated, the first transfer gate TG1 may be turned on. When the write word line WWL is deactivated, the first transfer gate TG1 may be turned off. When the write word line WWL is activated, the first transfer gate TG1 may transfer an output of the input circuit 1111 to the node b.

The second transfer gates P2 and N2 may be connected between the first transfer gates P1 and N1 and an output terminal of the second inverter INV2, and connected between an input terminal of the first inverter INV1 and the output terminal of the second inverter INV2. The second transfer gates P2 and N2 may be connected between the node b and a node d. The second transfer gates P2 and N2 are connected to the pair of write word lines (WWL and WWLB), and may be turned on or off according to whether the write word line WWL is activated. When the write word line WWL is activated, the second transfer gates P2 and N2 may be turned off. When the write word line WWL is deactivated, the second transfer gates P2 and N2 may be turned on. When the write word line WWL is deactivated, the second transfer gates P2 and N2 may transfer a signal from a the node d to the node b. The second transfer gates P2 and N2 may break a feedback loop of a node c and the node d of the latch circuit 1112a during a write mode operation. Herein, the node b and the node c are a common node. Accordingly, when data is input to the node c, data collision with the node d may be eliminated, so that write current consumption may be reduced.

The third transfer gates P3 and N3 may be connected between the input terminal of the first inverter INV1 and the output terminal of the second inverter INV2. The third transfer gates P3 and N3 may be connected between the node c and the node d. The third transfer gates P3 and N3 may be connected to the pair of column selection lines (CS and CSB), and may be turned on or off according to whether the column selection line CS is activated. When the column selection line CS is activated, the third transfer gates P3 and N3 may be turned off. When the column selection line CS is deactivated, the third transfer gates P3 and N3 may be turned on. When the column selection line CS is deactivated, the third transfer gates P3 and N3 may connect the node c and the node d to each other. The third transfer gates P3 and N3 may be connected to the pair of column selection lines CS and CSB to break the feedback loop in the latch circuit 1112a, like the second transfer gates P2 and N2 when a column is selected in the write mode.

Each of the first inverter INV1 and the second inverter INV2 may be combined to form an inverter circuit.

The read circuit 1112b may include a third inverter INV3 and fourth transfer gates P4 and N4 (or a fourth transfer gate TG4). An input terminal of the read circuit 1112b may be connected to an output terminal at a node e of the latch circuit 1112a. An output of the latch circuit 1112a may be an input of the third inverter INV3 of the read circuit 1112b. The third inverter INV3 may be an output buffer of data output from the latch circuit 1112a. The third inverter INV3 may transmit data having the same polarity as that of the node c to a node f. The fourth transfer gates P4 and N4 may be connected to an output of the third inverter INV3. The fourth transfer gates P4 and N4 may be connected to the pair of read word lines (RWL and RWLB). The fourth transfer gates P4 and N4 may be turned on or off depending on whether the read word line RWL is activated. When the read word line RWL is activated, the fourth transfer gates P4 and N4 are turned on to transmit an output of the third inverter INV3 to the read bit line RBL at a node g. When the read word line RWL is deactivated, the fourth transfer gates P4 and N4 may be turned off.

According to an embodiment, the first to fourth transfer gates TG1 to TG4 may be CMOS transfer gates. For example, each of the first to fourth transfer gates TG1 to TG4 may include a PMOS transistor and an NMOS transistor.

According to an embodiment, some devices included in the latch circuit 1112a may be high voltage transistors, and devices included in the input circuit 1111 and the read circuit 1112b may be low voltage transistors. According to an embodiment, the first PMOS transistor P0 and the first NMOS transistor N0 included in the input circuit 1111, and the third inverter INV3 and the fourth transfers gate P4 and N4 included in the read circuit 1112b may be designed to have a lower threshold voltage than a general transistor. Because the transistors included in the input circuit 1111 and the read circuit 1112b are provided as low-voltage transistors, a fast switching operation may be performed. The second transfer gates P2 and N2, the third transfer gates P3 and N3, the first inverter INV1, and the second inverter INV2 included in the latch circuit 1112a may be high voltage transistors. The second transfer gates P2 and N2, the third transfer gates P3 and N3, the first inverter INV1, and the second inverter INV2 included in the latch circuit 1112a may be designed to have a higher threshold voltage than a general transistor. For relatively fast data transfer, a low-voltage transistor may be applied to the devices included in the input circuit 1111 and the read circuit 1112b, and because fast transfer is not required for internal data storage, a high voltage transistor may be applied to the latch circuit 1112a. Alternatively, each of the transistors included in the input circuit 1111 and the read circuit 1112b may have a lower threshold voltage than each of the transistors included in the latch circuit 1112a.

FIG. 3C illustrates a truth table in a write mode of the memory device 100 according to an embodiment.

FIG. 3C is a bias condition table showing changes in SRAM data according to row, column, and data input in a write mode.

Unselected or not selected in the following tables and description of the inventive concept may mean that 0 is input to a corresponding line.

Referring to FIG. 3C, when a row and a column are not selected, the node c representing data in the latch circuit 1112a may retain a previous data and a new data may not be input. For example, a new data may not be input by turning off the first transfer gate TG1 in response to a deactivation of the write word line WWL. When either row or column is not selected, a previous data may be maintained in the latch circuit 1112a and a new data may not be input. For example, when the row is selected and the column is not selected, a new data may not be input by turning off the first PMOS transistor P0 and the first NMOS transistor N0 of the input circuit 1111 in response to signals of the data input lines D1B and D0 (e.g., D1B=1, D0=0). Referring to FIG. 3C, when both a row and a column are selected, a value of data input from the data input line may be written to the node c. In an embodiment, the signals of the data input lines D1B and D0 may be decided based on input data and signals of the column selection line CS. For example, when the column is not selected, the signals of the data input lines D1B and D0 are 1 and 0, respectively, regardless of the input data. When the column is selected, the signals of the data input lines D1B and D0 are 1 in response to the input data '0' and the signals of the data input lines D1B and D0 are 0 in response to the input data '1'.

FIG. 3D illustrates a truth table in a read mode of the memory device 100 according to an embodiment.

FIG. 3D is a truth table showing data output of the memory device 100 according to selection of the read word line RWL in the read mode. Referring to FIG. 3D, the node f that is the output of the third inverter INV3 may output data stored in the latch circuit 1112a regardless of whether the read word line RWL is selected. When the read word line RWL is not selected, the read bit line RBL may be in a Hi-z (high impedance) state or 1 or 0, which is an output value of another bit cell, depending on whether the connected multiplexer MUX is selected.

When the read word line RWL is selected, the data of the node f may be connected to the read bit line RBL through the fourth transfer gates P4 and N4 connected to the read word line RWL to output data stored in the latch circuit 1112a.

FIGS. 3E to 3K are diagrams illustrating a data path in the memory device 100 according to example embodiments.

Figure 3E:
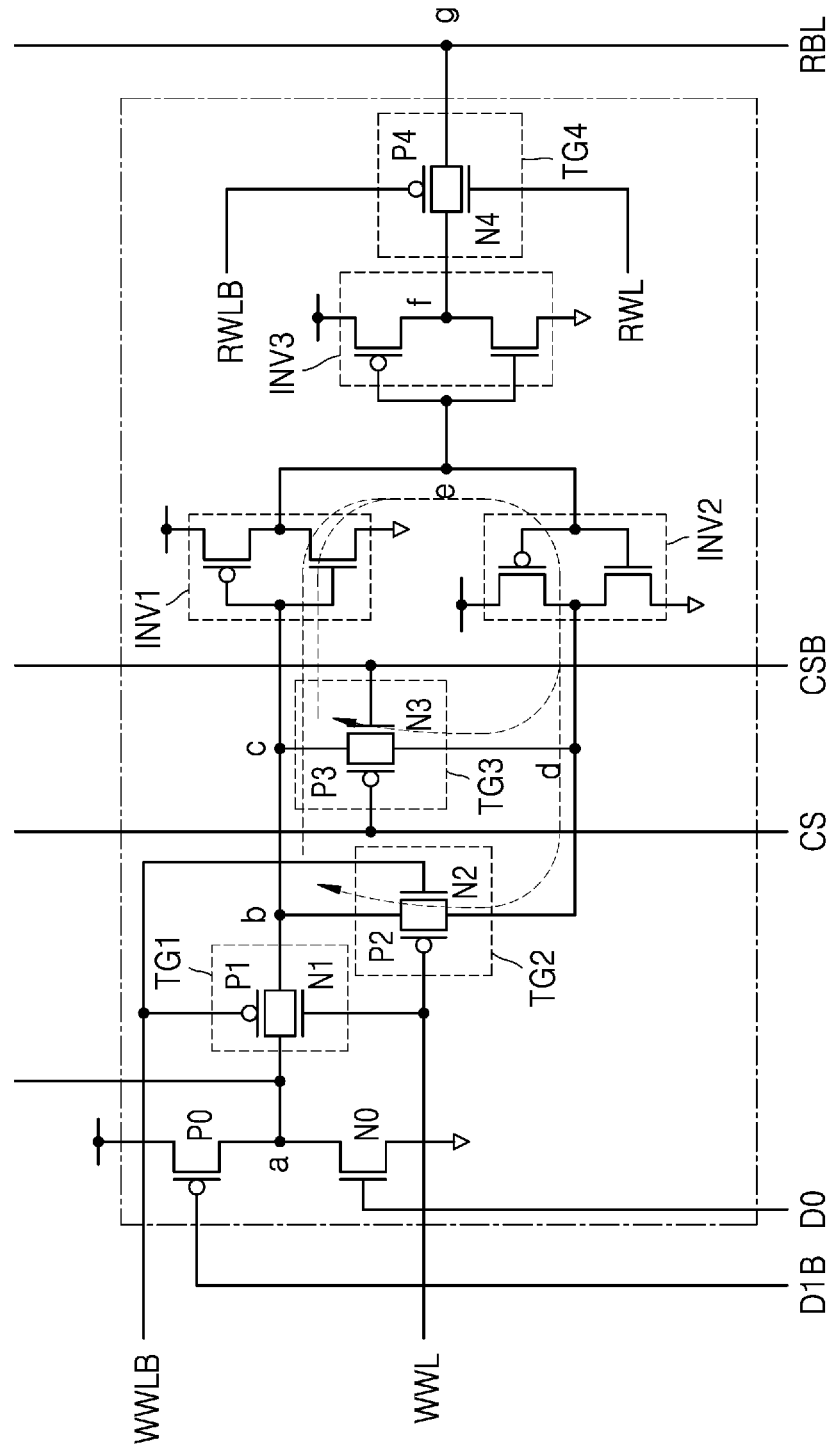
FIGS. 3E to 3K are diagrams illustrating data paths in various operations in a memory device according to an embodiment.

FIG. 3E illustrates a data path when neither row nor column is selected in a write mode of the memory device 100 according to an embodiment.

Referring to FIG. 3E, when neither row nor column is selected, both the write word line WWL and the column selection line CS are deactivated. Accordingly, the first PMOS transistor P0, the first NMOS transistor N0, and the first transfer gates P1 and N1 may be turned off. The second transfer gates P2 and N2 and the third transfer gates P3 and N3 may be turned on. Accordingly, data in the latch circuit 1112a may be maintained through an inverter latch path of node c->node e->node d->node c.

In this case, when the write word line WWL is deactivated before the column selection line CS, the data path may be a node c→node e→node d→node b→node c.

Figure 3F:
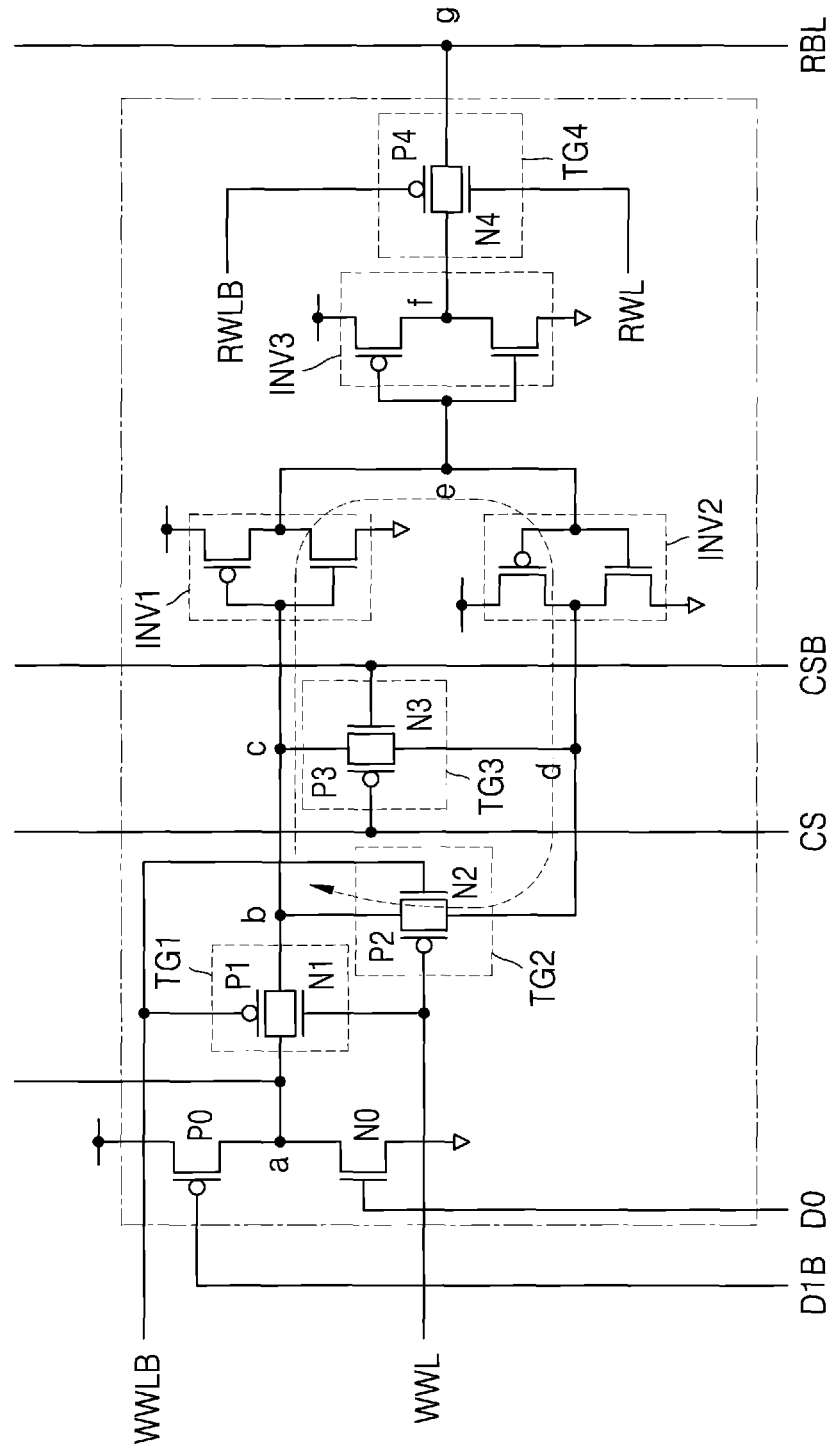

FIG. 3F illustrates a data path in a case in which a row is not selected and only a column is selected in the write mode of the memory device 100 according to an embodiment.

When a row is not selected, the write word line WWL is deactivated, and when a column is selected, the column selection line CS is activated. When a column is selected by a logic structure of a write driver, which is described below, data input lines D1B and D0 are also activated (e.g., D1B=0 and D0=1), so that data may be transferred to the node a through the first PMOS transistor P0 or the first NMOS transistor N0. However, because the write word line WWL is deactivated, the first transfer gates P1 and N1 may be turned off so that data may not be transferred to the node c. Due to the deactivation of the write word line WWL and the activation of the column selection line CS, the second transfer gates P2 and N2 may be turned on and the third transfer gates P3 and N3 may be turned off. Accordingly, a data path in the latch circuit 1112a repeats the node c—the node e—the node d—the node b—the node c, so that data stored in the latch circuit 1112a may be maintained.

Figure 3G:
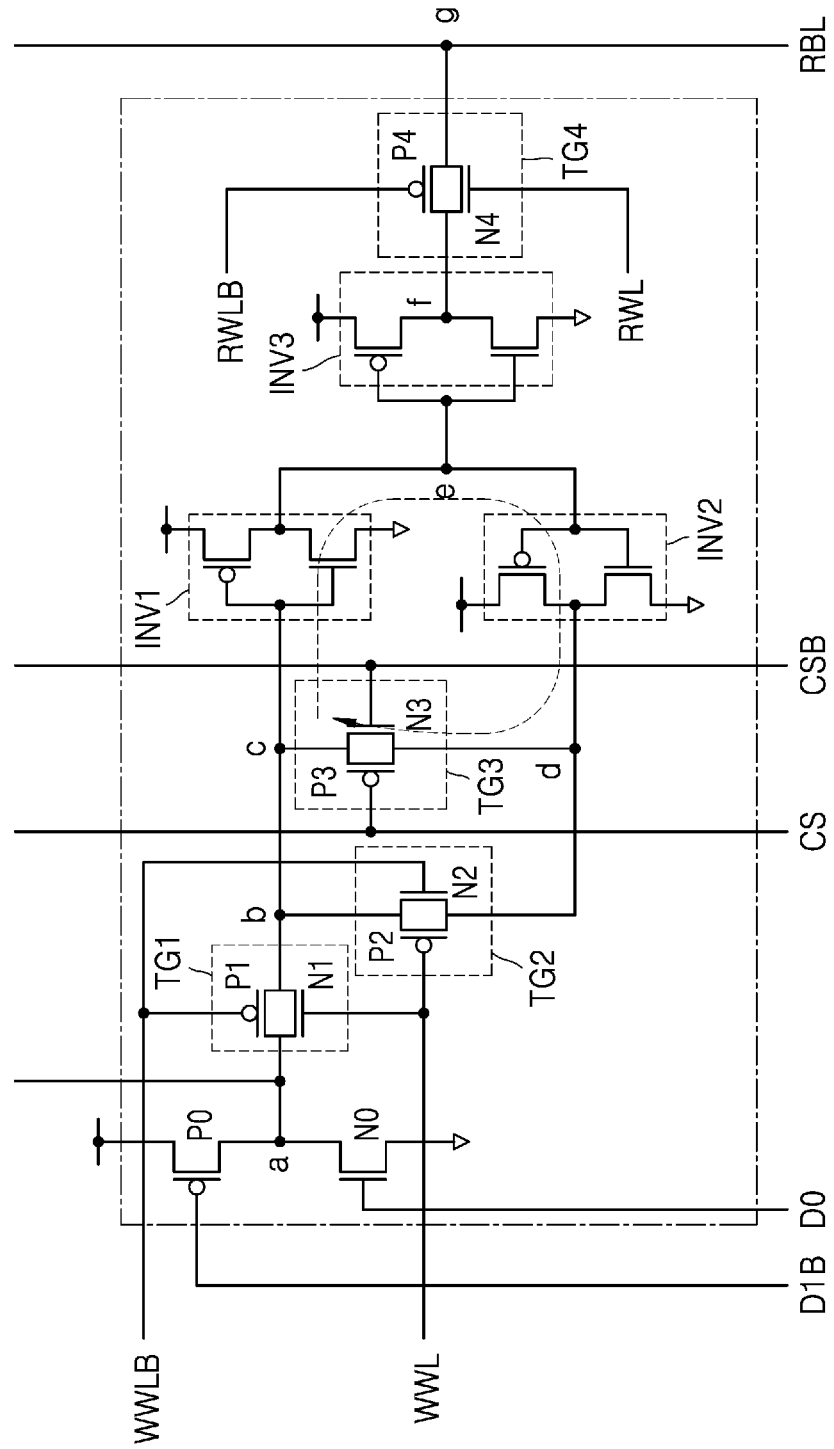

FIG. 3G illustrates a path of data in a case in which a row is selected but a column is not selected in a write mode of the memory device 100 according to an embodiment.

When a row is selected, the write word line WWL is activated, and when a column is not selected, the column selection line CS is deactivated. According to the inventive concept, because the column selection line CS of the bit cell that is not a write target is not activated, the data input lines D1B and D0 are also deactivated (e.g., D1B=1 and D0=0) by the write driver, so that the first PMOS transistor P0 and the first NMOS transistor N0 may be turned off. At this time, because the write word line WWL is activated, the first transfer gates P1 and N1 may be turned on so that the node a may maintain the same voltage as that of the node c. Due to the activation of the write word line WWL, the second transfer gates P2 and N2 may be turned off, and due to the deactivation of the column selection line CS, the third transfer gates P3 and N3 may be turned on. Through this, a feedback loop may be activated in the latch circuit 1112a, and internal data stored in the latch circuit 1112a may be maintained. According to an embodiment, the condition in which existing data is maintained as a row is selected and a column is not selected may be the same bias condition as the bit write mask function for maintaining existing data without writing a specific bit at the time of writing.

Figure 3H:
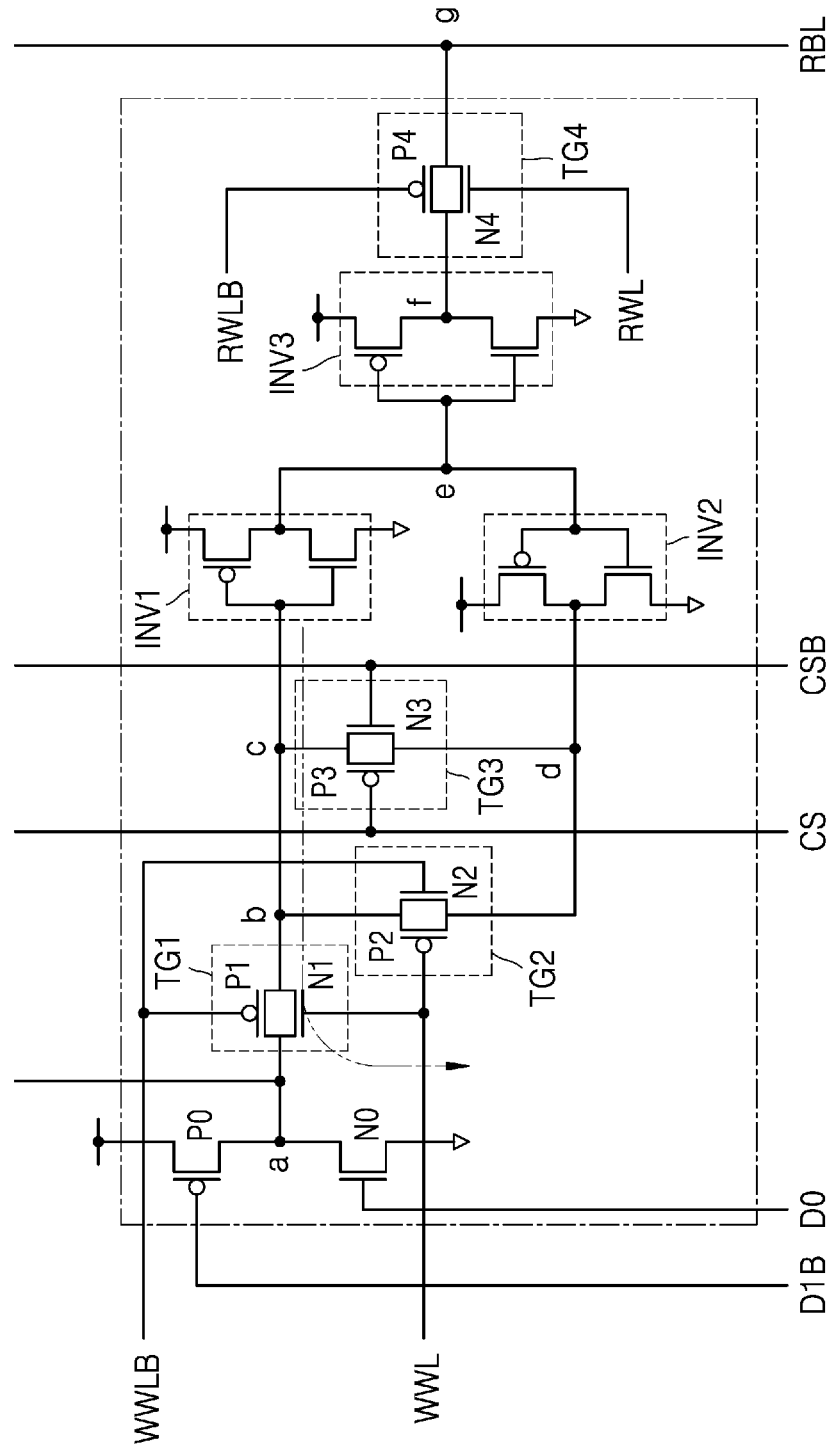

FIG. 3H illustrates a data path when both a row and a column are selected and data input is 0 in a write mode of the memory device 100 according to an embodiment.

When both a row and a column are selected, both the write word line WWL and the column selection line CS may be activated. When both the write word line WWL and the column selection line CS are activated, the data input lines D1B and D0 may also be activated.

When a column is selected and data is transmitted through the data input lines D1B and D0, if the data input is 0, the first PMOS transistor P0 may be turned off and the first NMOS transistor N0 may be turned on so that the node a may be discharged to zero. Due to the activation of the write word line WWL, the first transfer gates P1 and N1 may be turned on and the node c may be discharged to 0 V through the node a. At this time, both the second transfer gates P2 and N2 and the third transfer gates P3 and N3 are turned off due to the activation of the write word line WWL and the activation of the column selection line CS, and thus the node c and the node d may be electrically separated from each other. Accordingly, the feedback loop is broken and a data collision issue that occurs during writing may be prevented.

Figure 3I:
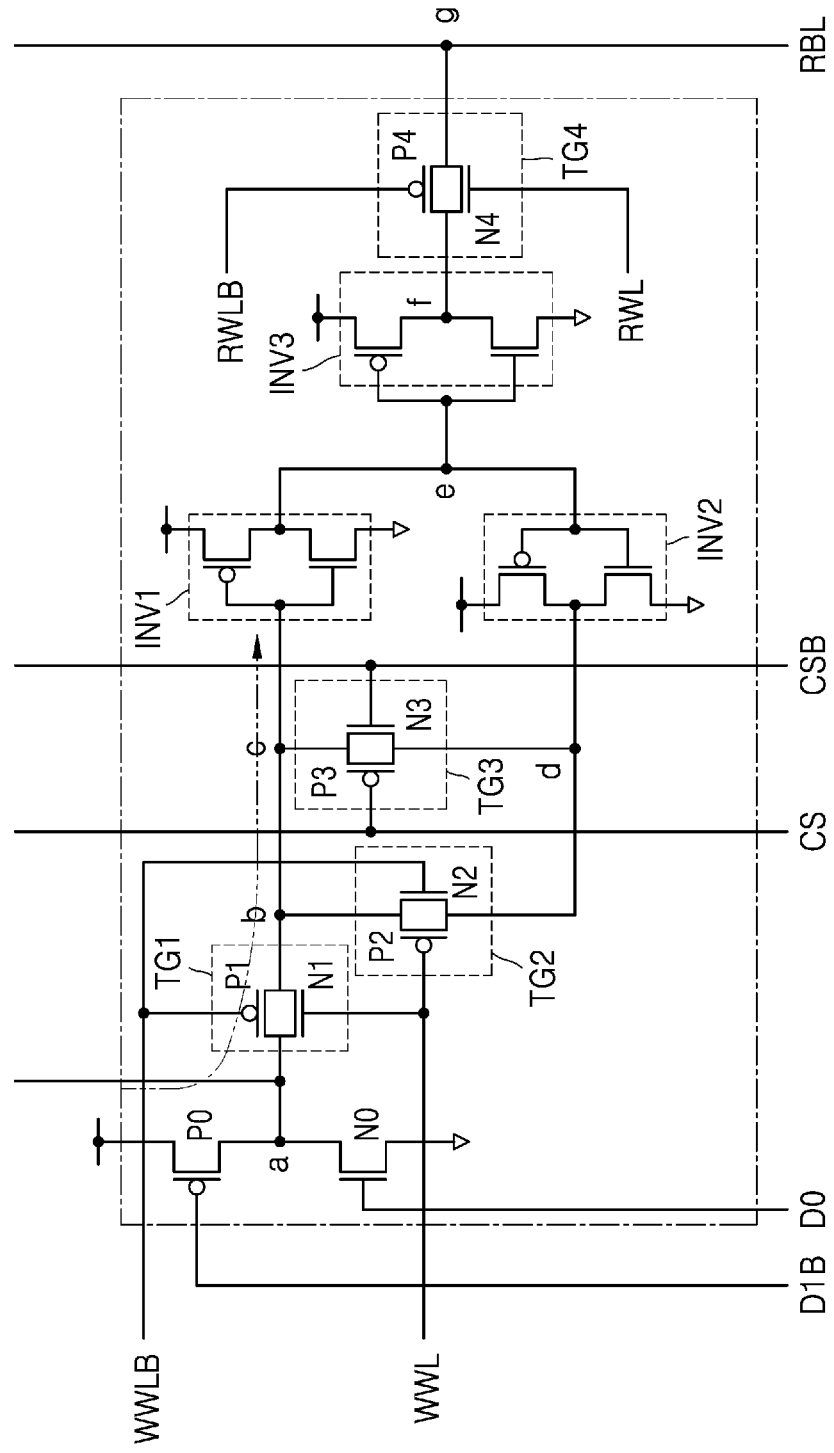

FIG. 3I illustrates a data path when both a row and a column are selected and data input is 1 in a write mode of the memory device 100 according to an embodiment.

When a column is selected and data is transmitted through the data input lines D1B and D0, if the data input is 1, the first PMOS transistor P0 may be turned on and the first NMOS transistor N0 may be turned off so that the node a may be charged to VDD. Due to the activation of the write word line WWL, the first transfer gates P1 and N1 may be turned on and the node c may be charged to VDD through the node a. At this time, both the second transfer gates P2 and N2 and the third transfer gates P3 and N3 are turned off due to the activation of the write word line WWL and the activation of the column selection line CS, so that the node c and the node d may be electrically separated from each other. Accordingly, the feedback loop may be broken, and a data collision issue that occurs during writing may be prevented.

Figure 3J:
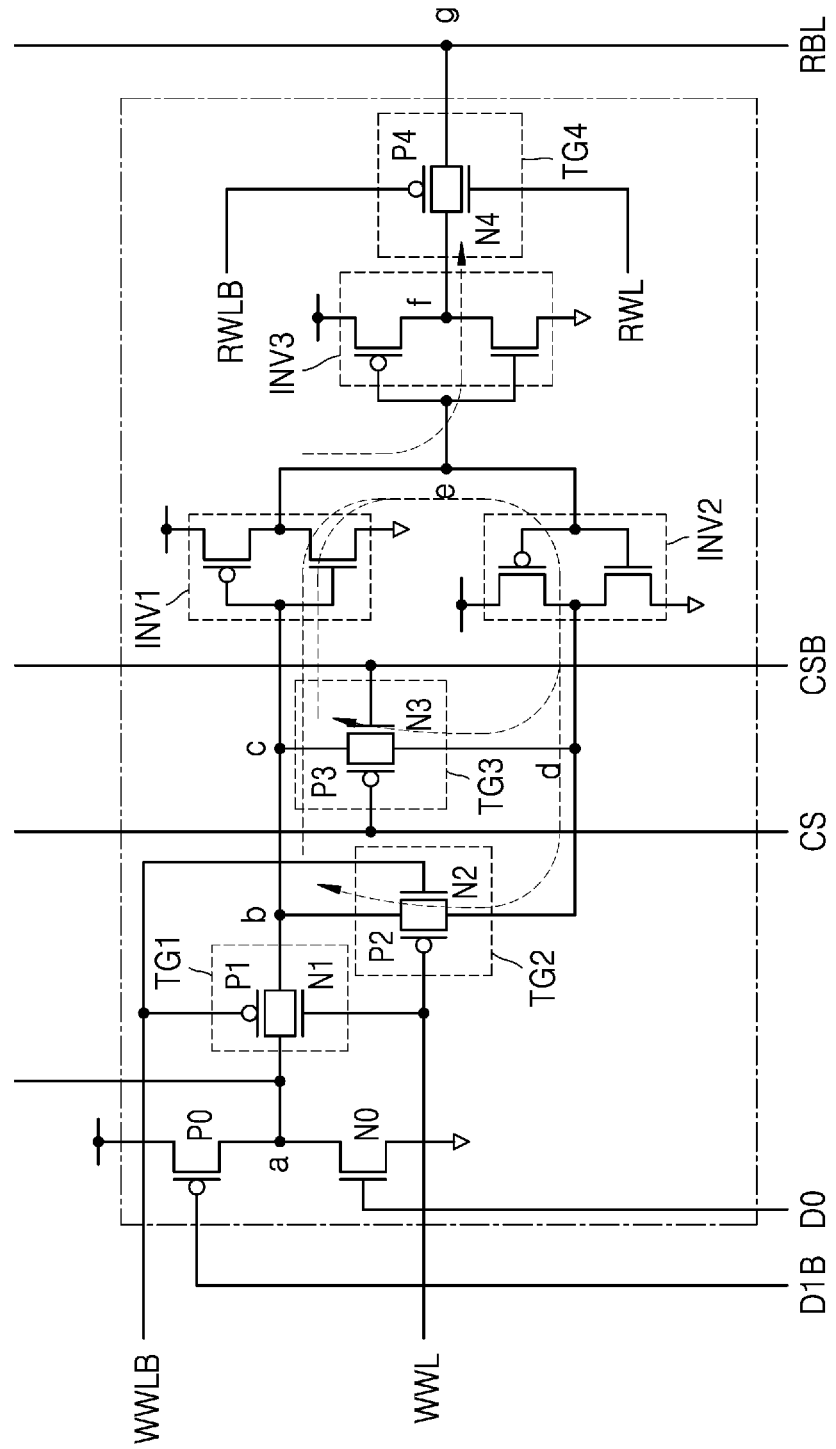

FIG. 3J illustrates a data path when a row is not selected in a read mode of the memory device 100 according to an embodiment.

In this case, because the memory device 100 is not in the write mode, the write word line WWL, the data input lines D1B and D0, and the column selection line CS are all deactivated. Accordingly, the first PMOS transistor P0, the first NMOS transistor N0, and the first transfer gates P1 and N1 may be turned off, and the second transfer gates P2 and N2 and the third transfer gates P3 and N3 may be turned on to maintain data.

Also, because the read word line RWL is not selected, the read word line RWL is also deactivated, so that the output through the third inverter INV3 may not be transferred to the read bit line RBL. At this time, the node of the read bit line RBL may be in a Hi-z (high impedance) or 1 or 0 as an output from another bit cell.

Figure 3K:
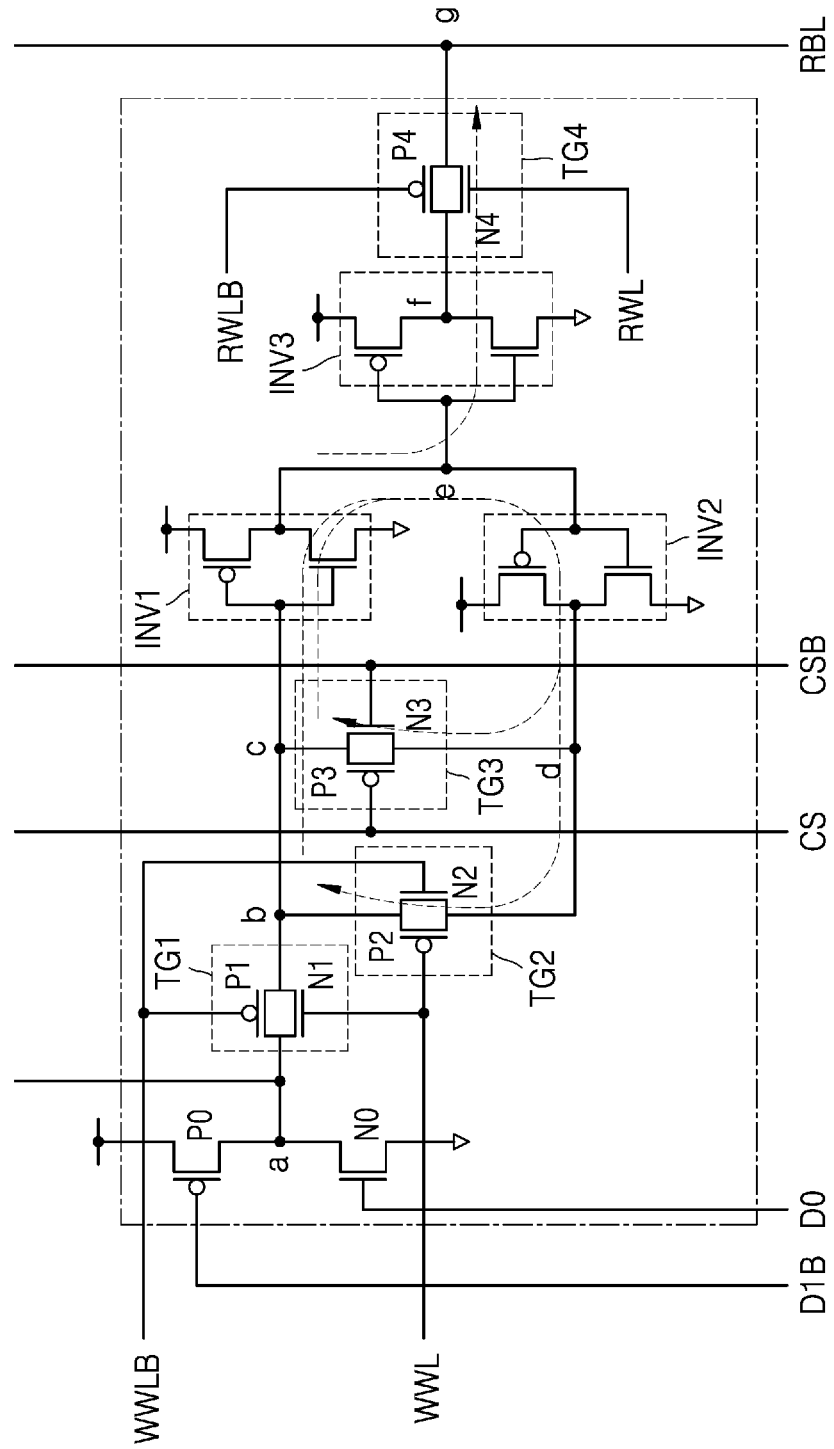

FIG. 3K illustrates a data path when a row is selected in a read mode of the memory device 100 according to an embodiment.

In this case, because the memory device 100 is not in the write mode, the write word line WWL, the data input lines D1B and D0, and the column selection line CS are all deactivated. Accordingly, the first PMOS transistor P0, the first NMOS transistor N0, and the first transfer gates P1 and N1 may be turned off, and the second transfer gates P2 and N2 and the third transfer gates P3 and N3 may be turned on to maintain data.

Because the read word line RWL is selected, the read word line RWL is activated, so that the output of the third inverter INV3 may be transferred to the read bit line RBL to output data.

Figure 4A:
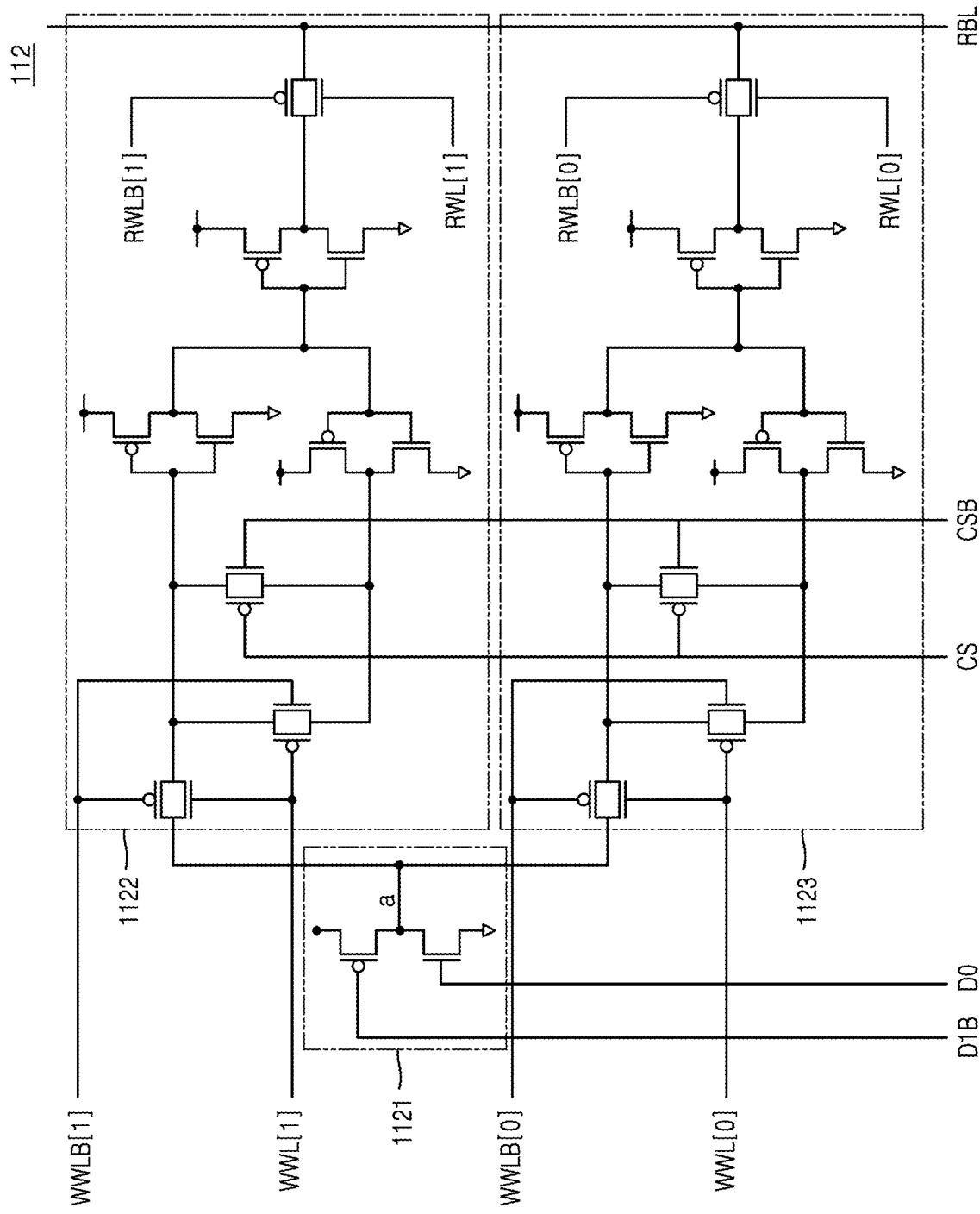
FIG. 4A is a circuit diagram of a multi-bit cell according to an embodiment.

FIG. 4A is a circuit diagram of a multi-bit cell according to an embodiment.

In the following embodiments of FIGS. 4A, 5A, and 6A, descriptions of the same configuration as the structure of the multi-bit cell described above with reference to FIG. 3A are omitted.

Referring to FIG. 4A, one multi-bit cell 112 may include an input circuit 1121 and two bit cells 1122 and 1123. The structure of each of the two bit cells 1122 and 1123 may be the same as that of the bit cell 1112 of FIG. 3B. Transistors included in the multi-bit cell 112 may include two transistors of the input circuit 1121 and 28 of 14×2 transistors included in the two bit cells 1122 and 1123, totaling 30. That is, the multi-bit cell 112 according to the embodiment of FIG. 4A may be provided in a structure having 15 transistors per one bit cell. Compared to FIG. 3A, there is an effect that a loading capacitance of the node a connected to the input circuit 1121 may be reduced, and thus performance may be improved.

Figure 4B:
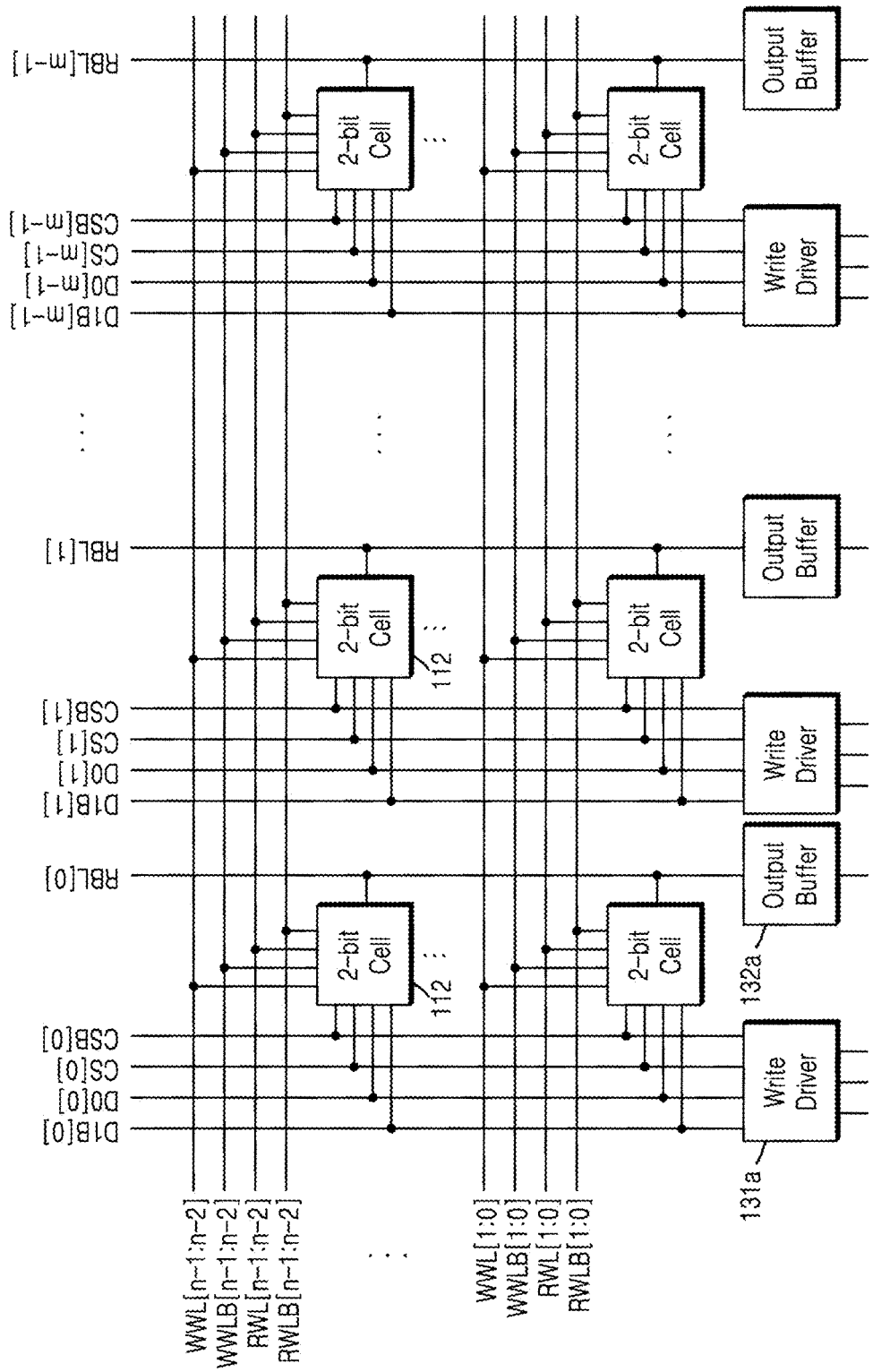
FIG. 4B is a block diagram illustrating a connection relationship of a multi-bit cell of FIG. 4A according to an embodiment.

FIG. 4B is a block diagram illustrating a connection relationship of the multi-bit cell 112 of FIG. 4A according to the embodiment.

Referring to FIG. 4B, a block diagram in which the multi-bit cell 112 of FIG. 4A is connected to a pair of write word lines (WWL and WWLB) and a pair of read word lines (RWL and RWLB), data input lines D1B and D0, and a pair of column selection lines (CS and CSB) is disclosed.

Because the multi-bit cell 112 illustrated in FIG. 4A includes two bit cells, there may be two pairs of write word lines and read word lines connected to one multi-bit cell 112. For example, the multi-bit cell 112 may include two bit cells indicated as a 2-bit cell. The write word lines connected to one multi-bit cell 112 may be WWL [n-1: n-2] and WWLB [n-1: n-2], and the read word lines connected to one multi-bit cell 112 may be RWL [n-1: n-2] and RWLB [n-1: n-2]. The multi-bit cells 112 arranged in the column direction may share one pair of data input lines D1B [m-1:0] and D0[m-1:0] and one pair of column selection lines CS [m-1:0] and CSB [m-1:0].

Outputs of the multi-bit cells 112 arranged in the column direction may be connected to one of read bit lines RBL [m-1:0]. A data input signal and a column selection signal, which are signals input in the column direction, may be outputs from a write driver 131a. A read bit signal, which is a signal output in the column direction, may be transferred to an output buffer 132a. The write driver 131a and the output buffer 132a may be included in the page buffer 130 of FIG. 1.

Figure 5A:
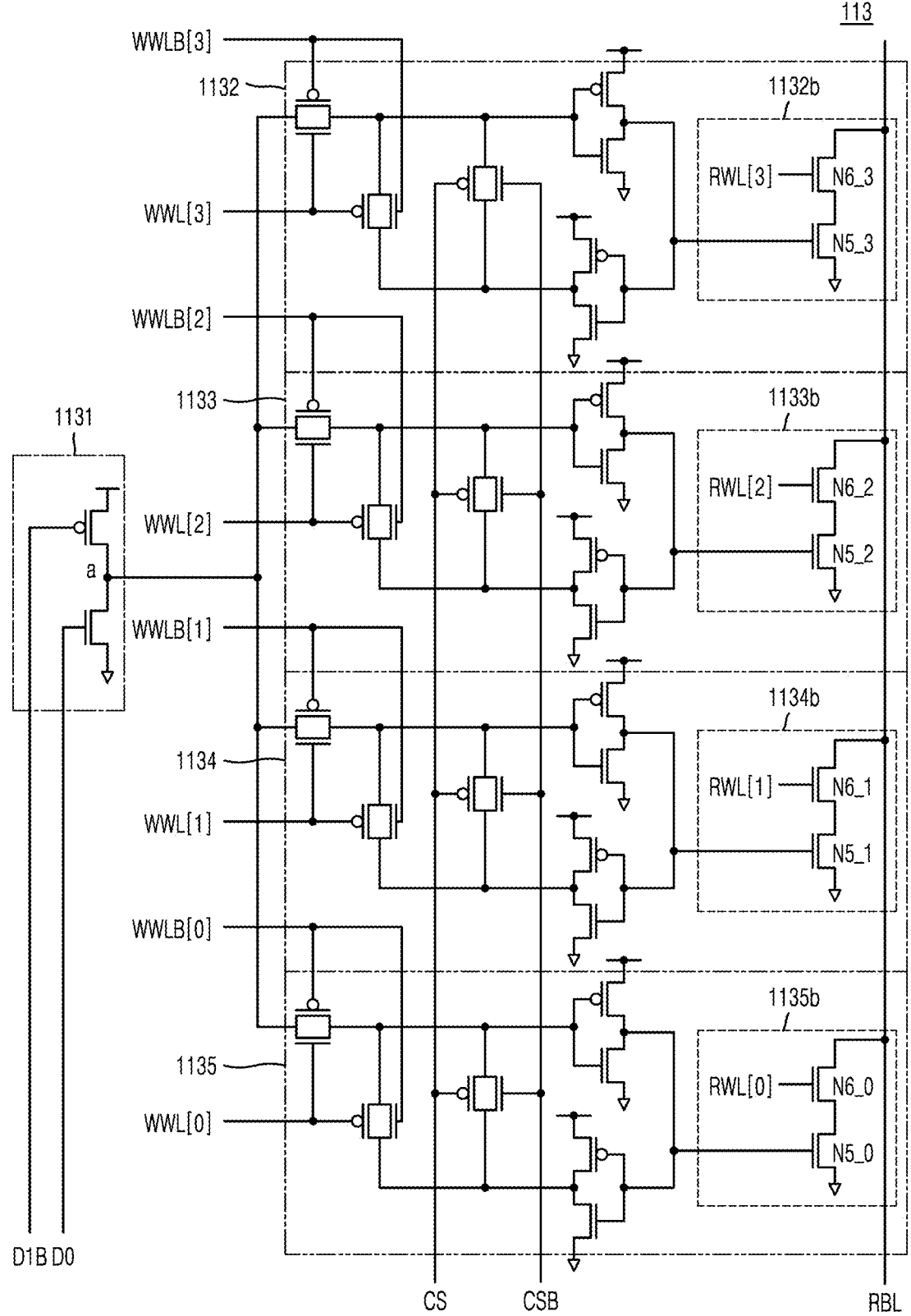
FIG. 5A is a circuit diagram of a multi-bit cell according to an embodiment.

FIG. 5A is a circuit diagram of a multi-bit cell 113 according to an embodiment.

Referring to FIG. 5A, one multi-bit cell 113 may include an input circuit 1131 and four bit cells 1132, 1133, 1134, and 1135. The bit cell 1132 may include a read circuit 1132b, the bit cell 1133 may include a read circuit 1133b, the bit cell 1134 may include a read circuit 1134b, and the bit cell 1135 may include a read circuit 1135b. According to the embodiment of FIG. 5A, the structure of each of the read circuits 1132b, 1133b, 1134b, and 1135b is different from that described above. The read circuits 1132b, 1133b, 1134b, and 1135b illustrated in FIG. 5A may include second NMOS transistors N5_0 to N5_3 and third NMOS transistors N6_0 to N6_3, respectively. According to an embodiment, the second NMOS transistors N5_0 to N5_3 may serve as an output buffer of the latch circuit. According to an embodiment, the second NMOS transistors N5_0 to N5_3 may perform the same function as the third inverter INV3 of FIG. 3B. The third NMOS transistors N6_0 to N6_3 may serve as a switch that determines whether to output data. A read bit line RBL may be connected to outputs of the third NMOS transistors N6_0 to N6_3.

Transistors included in the multi-bit cell 113 may include two transistors of the input circuit 1131 and 48 of 12×4 transistors included in the four bit cells 1132 to 1135, totaling 50. The multi-bit cell 113 of the embodiment according to FIG. 5A may be provided in a structure having 12.5 transistors per bit cell. Compared to FIG. 3A, the number of transistors included per bit cell may be two fewer. According to the embodiment of FIG. 5A, by changing the read circuits 1132b, 1133b, 1134b, and 1135b to a structure including two NMOS transistors to reduce the number of devices used per bit cell to 12.5, an effect of reducing the area of the bit cell may be expected.

Figure 5B:
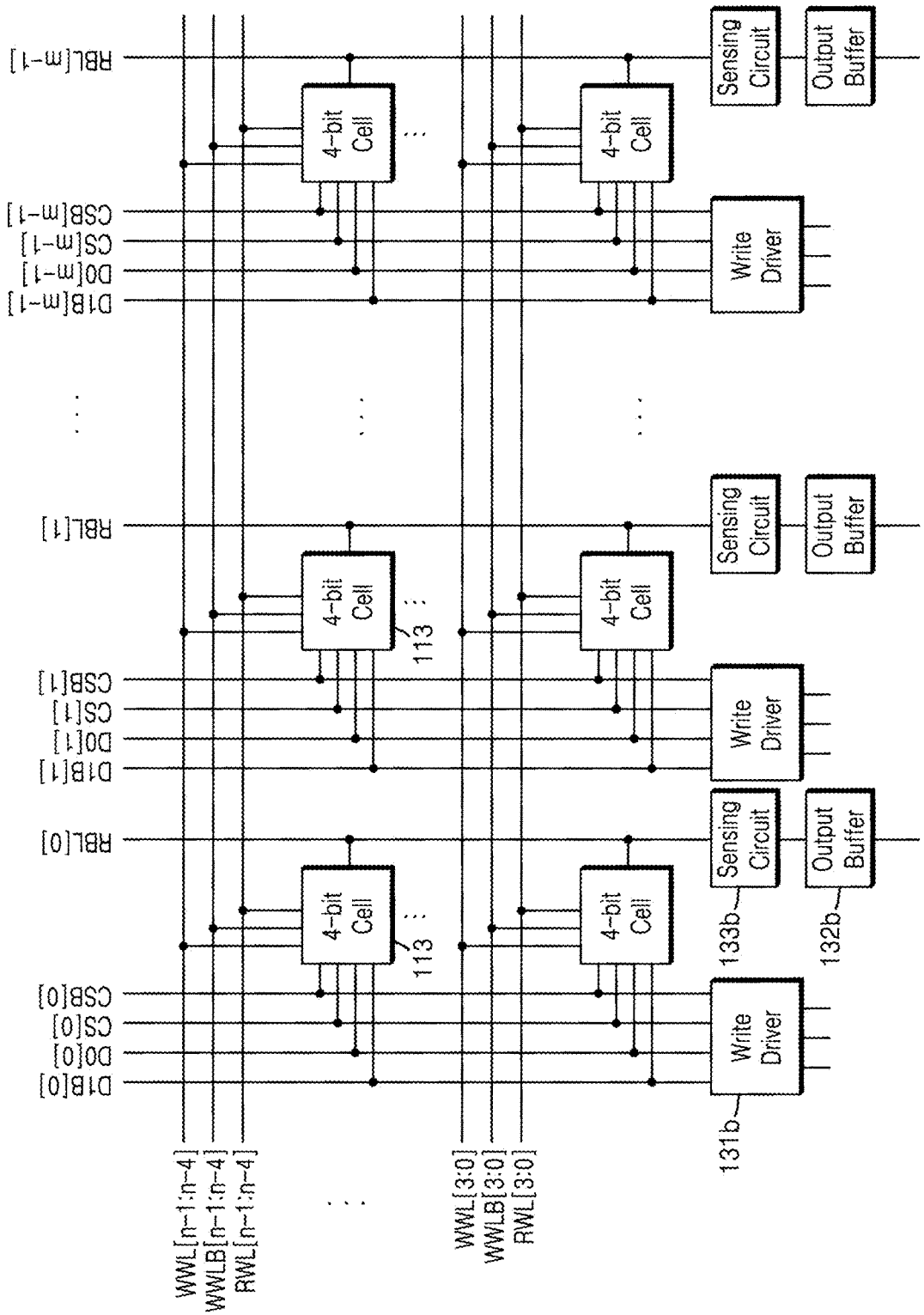
FIG. 5B is a block diagram illustrating a connection relationship of a multi-bit cell of FIG. 5A according to an embodiment.

FIG. 5B is a block diagram illustrating a connection relationship of the multi-bit cell 113 of FIG. 5A according to an embodiment.

Because the multi-bit cell 113 according to FIG. 5A includes four bit cells 1132 to 1135, there may be four pairs of write word lines (WWL and WWLB) and four read word lines (RWL) connected to one multi-bit cell 113. Referring to FIG. 5B, the write word lines connected to one multi-bit cell 113 may be WWL [n-1: n-4] and WWLB [n-1: n-4], and a read word line connected to one multi-bit cell 113 may be RWL [n-1: n-4]. For example, the multi-bit cell 113 may include four bit cells indicated as the 4-bit cell. According to an embodiment, the multi-bit cell 113 illustrated in FIG. 5A uses one NMOS transistor as a switch for determining whether to read, and thus, the read word line RWL may be provided as a single line instead of a pair. The multi-bit cells 113 arranged in the column direction may share one pair of data input lines D1B [m-1:0] and D0 [m-1:0] and one pair of column selection lines CS [m-1:0] and CSB [m-1:0]. Outputs of the multi-bit cells 113 arranged in the column direction may be connected to one of the read bit lines RBL [m-1:0]. The data input signal and the column selection signal, which are signals input in the column direction, may be outputs of a write driver 131b. The read bit signal, which is a signal output in the column direction, may be transmitted to a sensing circuit 133b and an output buffer 132b. The write driver 131b, the sensing circuit 133b, and the output buffer 132b may be included in the page buffer 130 of FIG.

1. According to the embodiment of FIG. 5A, each of the read circuits 1132b, 1133b, 1134b, and 1135b includes only NMOS transistors, and the memory device 100 may further include an additional circuit such as a pre-charge circuit or a sense amplifier (S/A) circuit used during a read operation.

Figure 6A:
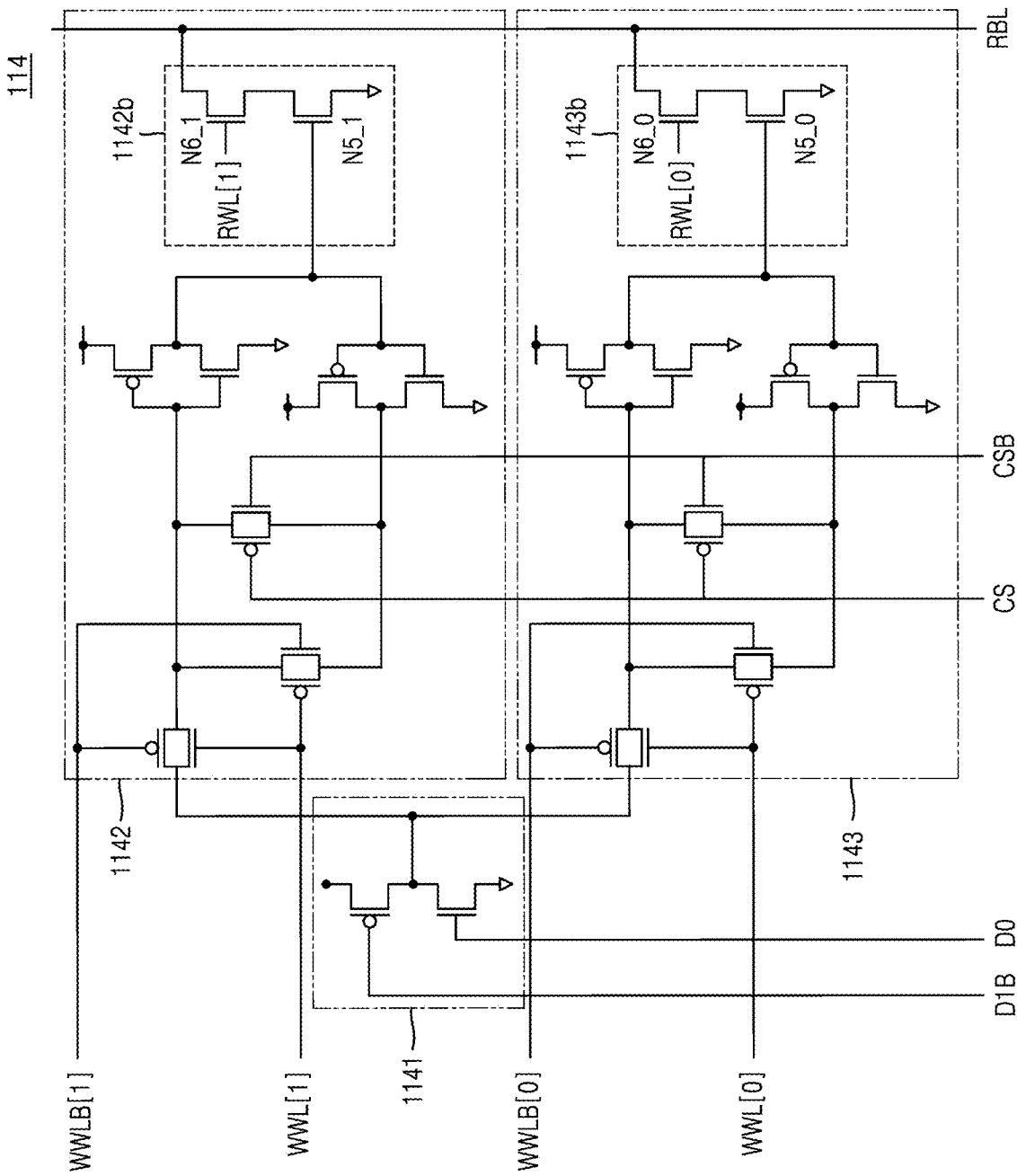
FIG. 6A is a circuit diagram of a multi-bit cell according to an embodiment.

FIG. 6A is a circuit diagram of a multi-bit cell 114 according to an embodiment.

Referring to FIG. 6A, one multi-bit cell 114 may include an input circuit 1141 and two bit cells 1142 and 1143. The bit cell 1142 may include a read circuit 1142b and the bit cell 1143 may include a read circuit 1143b. According to the embodiment of FIG. 6A, the structure of each of the read circuits 1142b and 1143b is the same as that of the embodiment of FIG. 5A. The read circuits 1142b and 1143b according to FIG. 6A may include second NMOS transistors N5_0 and N5_1 and third NMOS transistors N6_0 and N6_1, respectively.

The transistors included in the multi-bit cell 114 according to the embodiment of FIG. 6A includes two transistors of the input circuit 1141 and 24 of 12×2 transistors included in the two bit cells 1142 and 1143, totaling 26. The multi-bit cell 114 of the embodiment according to FIG. 6A may be provided in a structure having 13 transistors per bit cell. Compared to FIG. 3A, the number of transistors included per bit cell may be 1.5 fewer. According to the embodiment of FIG. 6A, by changing the read circuit 1112b to a structure including two NMOS transistors to reduce the number of devices used per bit cell to 13, an effect of reducing the area of the bit cell may be expected. In addition, because the number of bit cells included in the multi-bit cell 114 is reduced compared to FIG. 5A, the writing performance may be improved by reducing a loading capacitance of the node a.

Figure 6B:
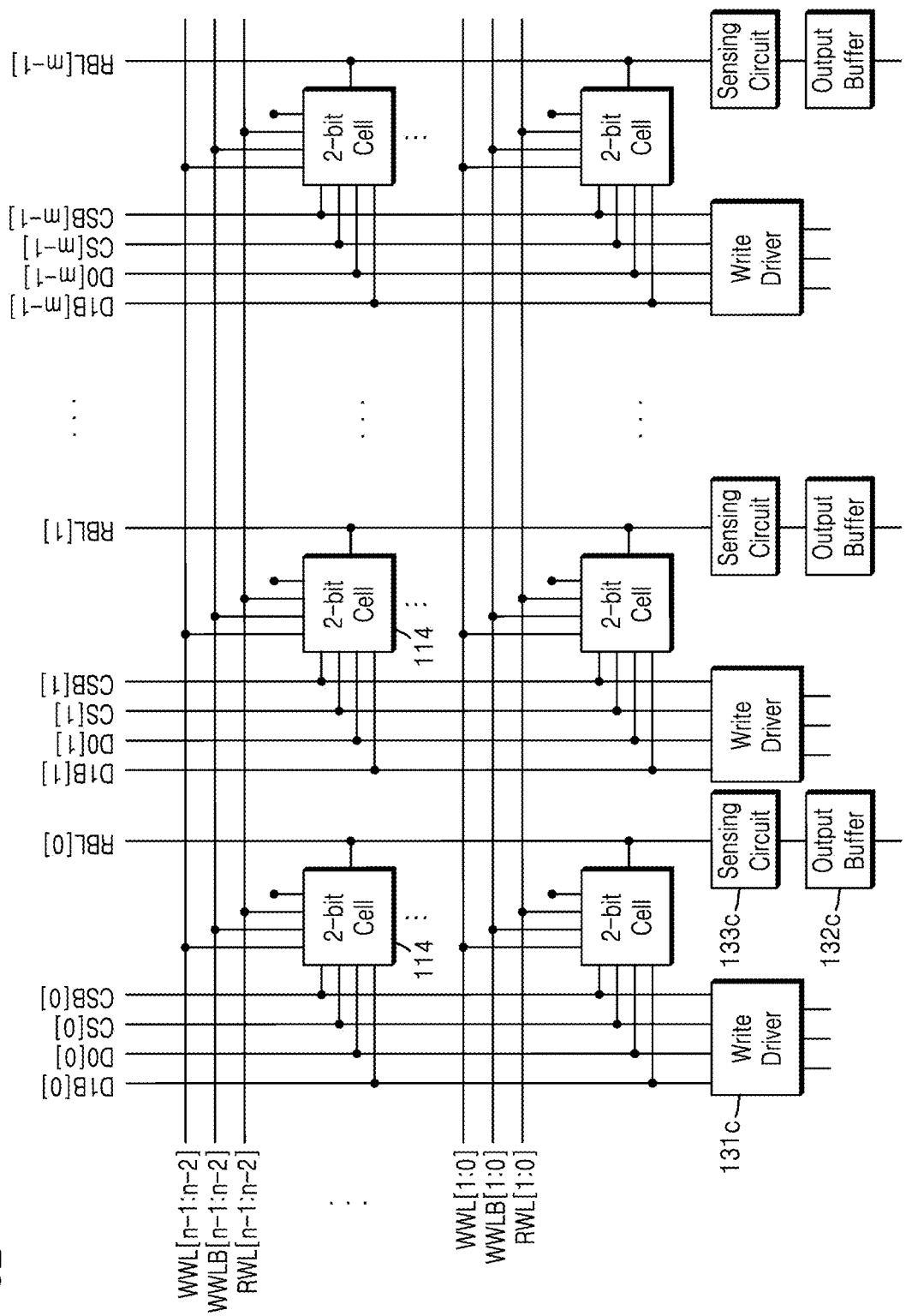
FIG. 6B is a block diagram illustrating a connection relationship of a multi-bit cell according to an embodiment of FIG. 6A.

FIG. 6B is a block diagram illustrating a connection relationship of the multi-bit cell 114 according to the embodiment of FIG. 6A.

Because the multi-bit cell 114 illustrated in FIG. 6A includes two bit cells, there may be two pairs of write word lines (WWL and WWLB) and two read word lines (RWL) connected to one multi-bit cell 114. For example, the multi-bit cell 114 may include two bit cells indicated as the 2-bit cell. The write word lines connected to one multi-bit cell 114 may be WWL [n-1: n-2] and WWLB [n-1: n-2], and the read word lines connected to one multi-bit cell 114 may be RWL [n-1: n-2]. The data input signal and the column selection signal, which are signals input in the column direction, may be outputs from the write driver 131c. The read bit signal, which is a signal output in the column direction, may be transmitted to a sensing circuit 133c and an output buffer 132c. The write driver 131c, the sensing circuit 133c, and the output buffer 132c may be included in the page buffer 130 of FIG. 1.

The memory device 100 according to the inventive concept may solve the half-selected problem by separating the data input line and the column selection line to perform data input and column selection through separate lines.

Figure 7A:
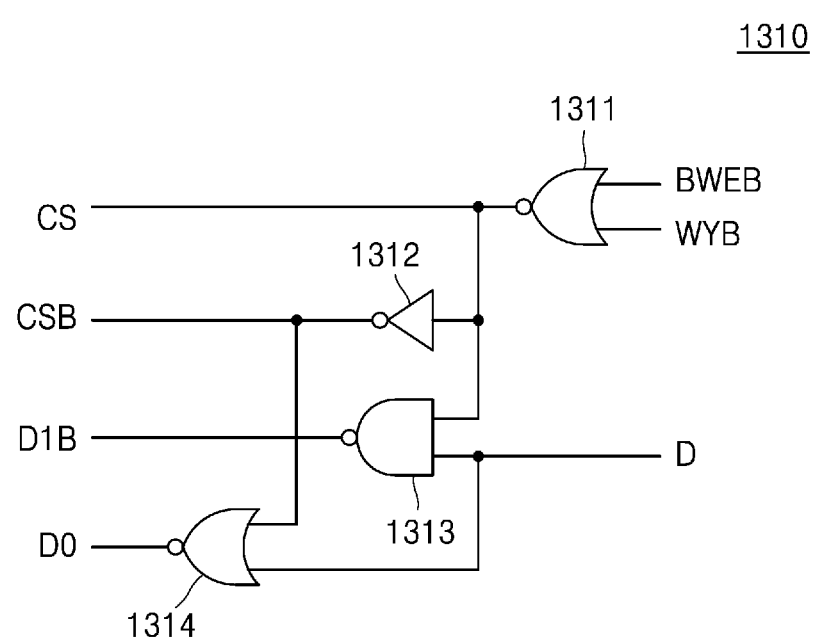
FIG. 7A is a structure of a write driver according to an embodiment.

FIG. 7A is a structure of a write driver 1310 according to an embodiment.

Referring to FIG. 7A, the write driver 1310 may be a column direction write driving circuit. FIG. 7B shows each input/output truth table of the write driver 1310 of FIG. 7A according to an embodiment.

The write driver 1310 of FIG. 7A may be included in the page buffer 130 of the memory device 100 of FIG. 1. The write driver 1310 illustrated in FIG. 7A may receive three signals and output four signals. The write driver 1310 may receive three signals and separately output data input signals D1B and D0 and column selection signals CS and CSB in a column direction. Herein, for convenience of description, the terms of the data input lines D1B and D0 and the data input signals D1B and D0 may be used interchangeably, and the terms of the column selection lines CS and CSB and the column selection signals CS and CSB may be used interchangeably.

In the case of the write driver according to FIG. 7A, in order to prevent a data fighting issue between the node c and the node d, the data signals in the write mode should be activated after a column is selected, that is, after the third transfer gates P3 and N3 in FIG. 3A are turned off and the feedback loop is broken. Accordingly, according to the write driver 1310 of FIG. 7A, a logic structure is disclosed such that the data input signals D1B and D0 are activated (e.g., D1B=0 and D0=1) only after the column selection signals CS and CSB are first activated (e.g., CS=1 and CSB=0).

This is described in more detail with reference to the truth table of FIG. 7B.

Referring to FIG. 7A, the write driver 1310 may include a first NOR gate 1311, a second NOR gate 1314, a fourth inverter 1312, and a NAND gate 1313. Referring to FIG. 7A, an input of the first NOR gate 1311 may be a BWEB signal and a WYB signal. A bit write enable bar (BWEB) signal may be a complementary signal of a bit write enable (BWE or WE) signal. A write y-address bar (WYB) signal may be a complementary signal of a write signal in a column direction. D (input data) signal may be an external data signal. During a write mode or a write operation both the BWEB signal and the WYB signal are 0 and a corresponding column may be selected.

An input of the fourth inverter 1312 may be an output of the first NOR gate 1311. An input of the NAND gate 1313 may be the D signal and the output of the first NOR gate 1311. An input of the second NOR gate 1314 may be an output of the fourth inverter 1312 and the D signal.

By the first NOR gate 1311, when both the BWEB signal and the WYB signal are 0, the output of the first NOR gate 1311 may be 1. By the first NOR gate 1311, when at least one of the BWEB signal and the WYB signal is 1, the output of the first NOR gate 1311 may be 0. Signals CS and CSB of the column selection line may be complementary to each other by the first NOR gate 1311 and the fourth inverter 1312.

The data input signal input to the input circuit may be output by the NAND gate 1313 and the second NOR gate 1314. The input D signal may be an external signal including information on data. By the NAND gate 1313, when at least one of the output of the first NOR gate 1311 and the D signal is 0, the output of the NAND gate 1313 may be 1. By the NAND gate 1313, when both the output of the first NOR gate 1311 and the D signal are 1, the output of the NAND gate 1313 may be 0. In the case of the second NOR gate 1314, when both the D signal and the output of the fourth inverter 1312 are 0, the output of the second NOR gate 1314 may be 1. When at least one of the D signal and the output of the fourth inverter 1312 is 1, the output of the second NOR gate 1314 may be 0.

Referring to FIGS. 7A and 7B, when the column selection line is deactivated, that is, when the output of the first NOR gate 1311 is 0, the output of D1B is 1 and the output of D0 is 0. As described above, D1B may be input to the gate of the first PMOS transistor P0, and D0 may be input to the gate of the first NMOS transistor N0. Accordingly, when the column selection line is deactivated, both the first PMOS transistor P0 and the first NMOS transistor N0 may be deactivated. When the column selection line is activated, that is, when the output of the first NOR gate 1311 is 1, either one of the first PMOS transistor P0 and the first NMOS transistor N0 may be activated and data may be transmitted.

The output of the first NOR gate 1311 may be a CS signal, the output of the fourth inverter 1312 may be a CSB signal, the output of the NAND gate 1313 may be a D1B signal, and the output of the second NOR gate 1314 may be a D0 signal. The CS signal and the CSB signal may be signals of the column selection line, and the D1B signal and the D0 signal may be signals of the data input line applied to the input circuit.

Figure 8:
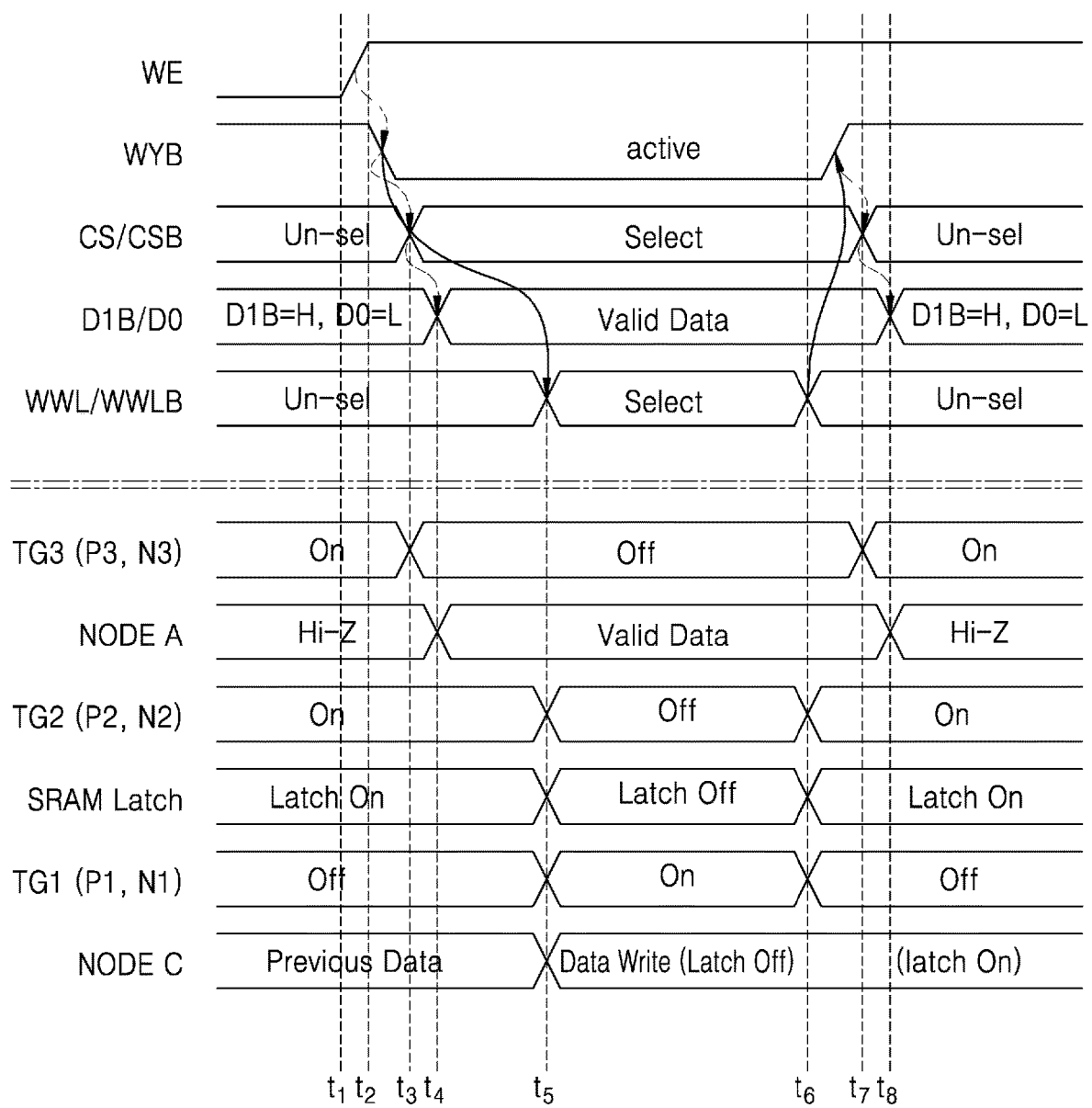
FIG. 8 is a timing diagram of signals related to an operation of a memory device according to an embodiment.

FIG. 8 is a timing diagram of signals related to an operation of the memory device 100 according to an embodiment.

Referring to FIG. 8, signals related to the operation of the memory device according to an embodiment may be divided into signals input from the outside and signals of devices inside a multi-bit cell. The signals input from the outside may refer to signals input from the outside of the memory cell array. The signals input from the outside may include a write enable signal WE (or bit write enable signal BWE), a complementary signal WYB of a write signal in the column direction, column selection signals CS/CSB, data input signals D1B/D0, and write word line signals WWL/WWLB. The write enable signal WE may be a signal applied from the control logic circuit 140 of FIG. 1. The write enable signal WE may activate the read word line RWL, or the write word line WWL, or the column selection line CS. The complementary signal WYB of the write signal in the column direction may be a signal applied from the control logic circuit 140 of FIG. 1. The complementary signal WYB of the write signal in the column direction may be complementary to the write enable signal WE. The column selection signals CS/CSB may be signals applied from the page buffer 130 of FIG. 1. The column selection signals CS/CSB and the data input signals D1B/D0 may be output signals from the write driver 131 in the page buffer 130 of FIG. 1.

Referring to FIG. 8, when the write enable signal changes from 0 to 1 at a time point t1, the complementary signal WYB changes from 1 to 0 at a time point t2. The column selection signals CS/CSB are activated at a time point t3 by a logic structure of the write driver, and accordingly, the data input signals D1B/D0 may also be sequentially activated at a time point t4. The write word line signals WWL/WWLB may also be activated at a time point t5.

The ON/OFF timing of the devices inside the bit cell may be determined according to whether externally input signals are activated. Whether the third transfer gate TG3 is turned on or off may be determined according to whether the column selection signals CS/CSB are activated. The third transfer gate TG3 may be turned off at the time point t3 when the column selection signals CS/CSB are activated. Whether the second transfer gate TG2 is turned on or off may be determined according to whether the write word line signals WWL/WWLB are activated. The second transfer gate TG2 may be turned off at the time point t5 when the write word line signals WWL/WWLB are activated. Whether the first transfer gate TG1 is turned on or off may be determined according to whether the write word line signals WWL/WWLB are activated. The first transfer gate TG1 may be turned on at the time point t5 when the write word line signals WWL/WWLB are activated.

For example, because the data input signal is valid when the write word line signal is activated and the column select signal is activated, data input to the input circuit may be transmitted to the node a. Also, when the write word line signal is activated, a feedback loop is broken due to OFF of the second transfer gate TG2, so that an inverter latch SRAM LATCH of the latch circuit may be turned off, and simultaneously, the data of the node a may be transferred to the node c. Accordingly, data is written to the latch circuit during an activation period (the time point t5 to the time point t6) of the write word line signal, and thereafter, when the write word line signal is deactivated (after a time point t6), data transfer is stopped and the latch is turned on, so that the data may be held.

Figure 9:
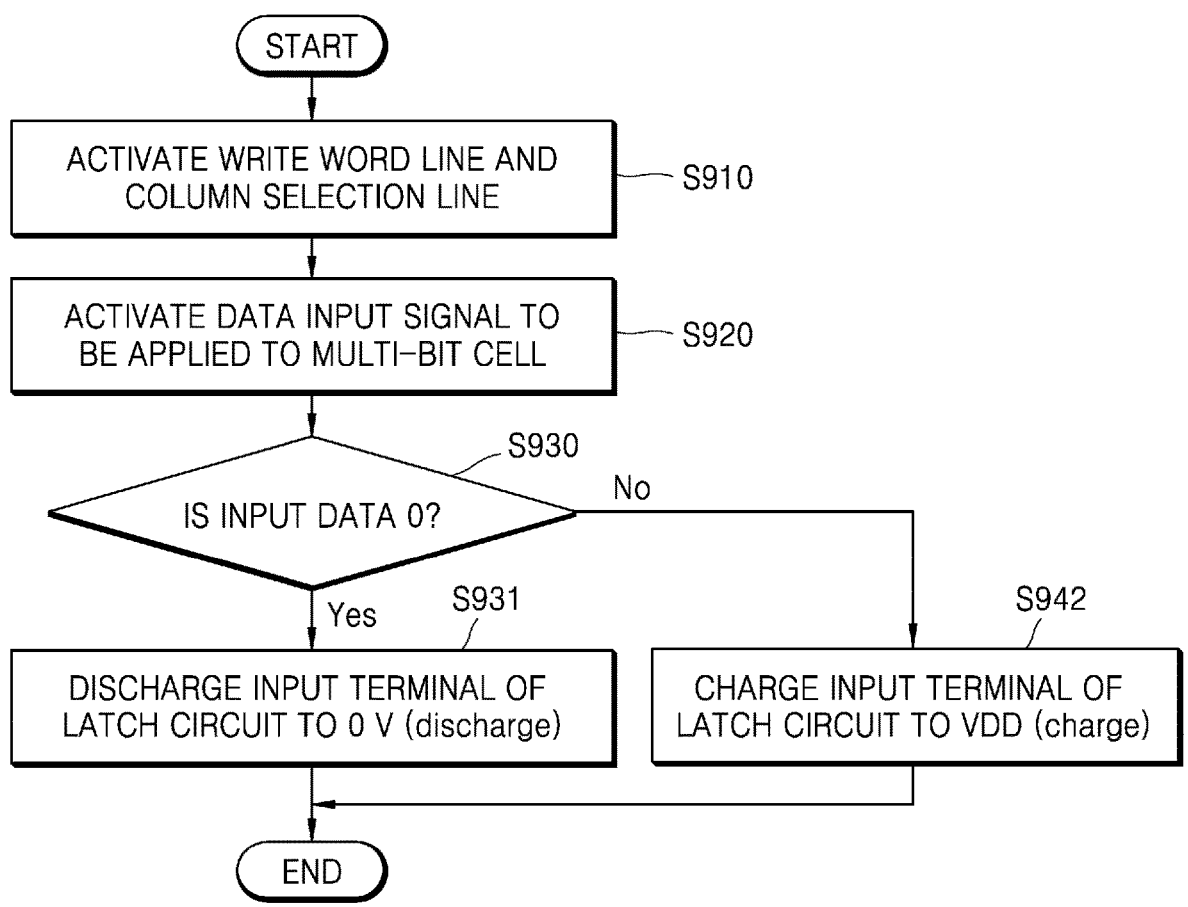
FIG. 9 is a flowchart of an operating method of a memory device according to an embodiment.

FIG. 9 is a flowchart of an operating method of a memory device according to an embodiment.

Referring to FIG. 9, a control logic circuit of a memory device activates a write word line and a column selection line connected to a multi-bit cell (S910). When the write word line and the column selection line are activated, the first transfer gates P1 and N1 in the multi-bit cell may be turned on, the second transfer gates P2 and N2 may be turned off, and the third transfer gates P3 and N3 may be turned off. Also, the data input lines connected to the input circuit may be activated due to the activation of the column selection line (S920). When the data input lines are activated, one of the first PMOS transistor P0 and the first NMOS transistor N0 may be turned on. When either one of the first PMOS transistor P0 and the first NMOS transistor N0 is turned on, the multi-bit cell may determine whether input data is 0 or 1 (S930). When the input data is 0, the first PMOS transistor P0 may be turned off and the first NMOS transistor N0 may be turned on. In this case, an input terminal of the latch circuit may be discharged to 0 V (S931). When the input data is 1 instead of 0, the first PMOS transistor P0 may be turned on and the first NMOS transistor N0 may be turned off. In this case, the input terminal of the latch circuit may be charged with VDD (S932).

Figure 10:
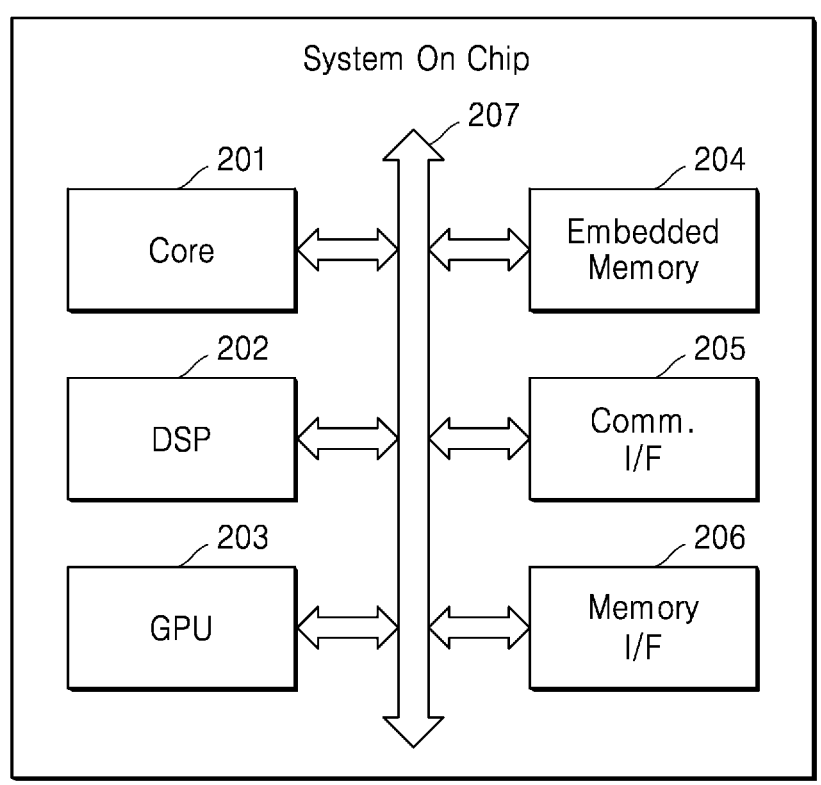
FIG. 10 is a block diagram of a system-on-chip according to an embodiment.

FIG. 10 is a block diagram of a system-on-chip according to an embodiment.

FIG. 10 is a block diagram illustrating a system-on-chip (SoC) 200 according to an embodiment. The SoC 200 may refer to an integrated circuit in which components of a computing system or another electronic system are integrated. For example, an application processor (AP), as an example of the SoC 200, may include a processor and components for other functions. As shown in FIG. 10, the SoC 200 may include a core 201, a digital signal processor (DSP) 202, a graphics processing unit (GPU) 203, a built-in memory 204, a communication interface 205, and a memory interface 206. Components of the SoC 200 may communicate with each other via a bus 207. The components of the SoC 200 may operate based on a particular supply voltage.

The core 201 may process instructions and may control operations of the components included in the SOC 200. For example, the core 201 may drive an operating system and execute applications on the operating system by processing a series of instructions. The DSP 202 may generate useful data by processing a digital signal, e.g., a digital signal provided from the communication interface 205. The GPU 203 may generate data for an image output on a display device from image data provided from the built-in memory 204 or the memory interface 206 and may encode the image data. In some embodiments, the memory device described above with reference to the drawings may be included in the core 201, the DSP 202 and/or the GPU 203, as a cache memory and/or a buffer. Accordingly, due to the high reliability and efficiency of the memory device, the core 201, the DSP 202 and/or the GPU 203 may also have high reliability and efficiency.

The built-in memory 204 may store data necessary for the core 201, the DSP 202, and the GPU 203 to operate. In some embodiments, the built-in memory 204 may include the memory device described above with reference to the drawings. Accordingly, the built-in memory 204 may provide a reliable write operation, may have a reduced area and power consumption, and, as a result, the operation reliability and efficiency of the SOC 200 may be improved.

The communication interface 205 may provide an interface for a communication network or one-to-one communication. The memory interface 206 may provide an interface for an external memory of the SoC 200, for example, dynamic random access memory (DRAM), flash memory, or the like.

While the inventive concept has been particularly shown and described with reference to embodiments thereof, it will be understood that various changes in form and details may be made therein without departing from the spirit and scope of the following claims.

What is claimed is:

1. A memory device comprising:
a memory cell array including a plurality of multi-bit cells,
wherein each of the plurality of multi-bit cells includes:
a plurality of bit cells commonly connected to a column selection line, respectively connected to a plurality of write word lines, and respectively connected to a plurality of read word lines; and
an input circuit including an output terminal connected to the plurality of bit cells, and configured to receive data input signals and to provide a first signal through the output terminal of the input circuit to the plurality of bit cells in response to the data input signals,
wherein each of the plurality of bit cells includes:
a latch circuit configured to receive the first signal through the output terminal of the input circuit in response to a write word line of the plurality of write word lines being activated, and latch the first signal in response to the write word line being deactivated or the column selection line being deactivated; and
a read circuit configured to output a second signal corresponding to a bit stored in the latch circuit, to a bit line in response to a read word line of the plurality of read word lines being activated, and
wherein each of the plurality of bit cells is connected between the output terminal of the input circuit and the bit line, and configured to receive the first signal from the input circuit through the output terminal of the input circuit and to output the second signal to the bit line through the read circuit.

2. The memory device of claim 1, wherein the input circuit includes:
a P-channel metal-oxide-semiconductor (PMOS) transistor configured to provide the first signal in response to a first data input signal of the data input signals; and
an N-channel metal-oxide semiconductor (NMOS) transistor connected to the PMOS transistor in series, and the NMOS transistor configured to provide the first signal in response to a second data input signal of the data input signals.

3. The memory device of claim 1, wherein the latch circuit includes:
a first transfer gate connected between an output terminal of the input circuit and a first node; and
second and third transfer gates respectively connected between the first node and a second node.

4. The memory device of claim 3, wherein the latch circuit further includes:
a first inverter including an input terminal connected to the first node; and
a second inverter including an input terminal connected to an output terminal of the first inverter and an output terminal connected to the second node.

5. The memory device of claim 3, wherein:
the first transfer gate is configured to turn on in response to the write word line of the plurality of write word lines being activated,
the second transfer gate is configured to turn on in response to the write word line of the plurality of write word lines being deactivated, and
the third transfer gate is configured to turn on in response to the column selection line being deactivated.

6. The memory device of claim 1, wherein the read circuit includes:
an inverter configured to receive an output from the latch circuit; and
a transfer gate connected between an output terminal of the inverter and the bit line.

7. The memory device of claim 1, wherein the read circuit includes:
a first N-channel metal-oxide semiconductor (NMOS) transistor configured to receive an output from the latch circuit; and
a second NMOS transistor electrically connected between the first NMOS transistor and the bit line in response to the read word line of the plurality of read word lines being activated.

8. The memory device of claim 1, further comprising:
a write driver configured to provide:
the data input signals corresponding to write data to a line extending in a column direction of the memory cell array during a write operation of the memory device to data input lines, and
a column selection line signal to the column selection line.

9. The memory device of claim 8, wherein the write driver includes:
a first NOR gate configured to receive a write enable signal and a column address signal;
a fourth inverter configured to receive an output from the first NOR gate;
a NAND gate configured to receive an external data signal and the output from the first NOR gate; and
a second NOR gate configured to receive an output from the fourth inverter and the external data signal.

10. The memory device of claim 9, wherein:
the first NOR gate is configured to output the column selection line signal,
the fourth inverter is configured to output a complementary column selection line signal,
the NAND gate is configured to output a first data input signal of the data input signals, and
the second NOR gate is configured to output a second data input signal of the data input signals.

11. The memory device of claim 1, wherein the memory device is a static random access memory (SRAM).

12. The memory device of claim 1, wherein at least one of transistors included in the latch circuit has a higher threshold voltage than that of a transistor included in the input circuit and the read circuit.

13. The memory device of claim 1, wherein the number of the plurality of bit cells is an even number.

14. A memory device comprising:
a memory cell array including a plurality of multi-bit cells,
wherein each of the plurality of multi-bit cells includes:
an input circuit; and
a plurality of bit cells connected to an output terminal of the input circuit,
wherein each of the plurality of bit cells includes:
a first transfer gate connected to the output terminal of the input circuit, and configured to receive a first data from the input circuit;
an inverter latch circuit including a first inverter and a second inverter connected to each other, and the inverter latch circuit configured to receive the first data from the first transfer gate and latch the first data;
a second transfer gate connected between an input terminal of the first inverter and an output terminal of the second inverter; and
a third transfer gate connected between the input terminal of the first inverter and the output terminal of the second inverter,
wherein the inverter latch circuit is configured to latch the first data in response to the second transfer gate being turned on or the third transfer gate being turned on.

15. The memory device of claim 14, wherein the input circuit includes:
a P-channel metal-oxide-semiconductor (PMOS) transistor and an N-channel metal-oxide semiconductor (NMOS) transistor connected to the PMOS transistor in series,
wherein a gate of the PMOS transistor is connected to a first data input line, and
wherein a gate of the NMOS transistor is connected to a second data input line.

16. The memory device of claim 15, wherein the third transfer gate is configured to turn on in response to a column selection line being deactivated.

17. The memory device of claim 16, wherein, in response to the column selection line being activated:
the PMOS transistor is configured to provide the first data to the first transfer gate in response to the first data input line being activated, or
wherein the NMOS transistor is configured to provide the first data to the first transfer gate in response to the second data input line being activated.

18. An operating method of a memory device including a plurality of bit cells each connected to a write word line and a column selection line, the operating method comprising:
providing a first data to each of the plurality of bit cells from an input circuit;
turning on a first transfer gate connected between an output terminal of the input circuit and an input terminal of a latch circuit, and turning off a second transfer gate connected between the input terminal and an output terminal of the latch circuit, in response to the write word line being activated;
storing the first data in the latch circuit by turning on the first transfer gate;
turning on the second transfer gate in response to the write word line being deactivated;
turning off a third transfer gate connected between the input terminal and the output terminal of the latch circuit in response to the column selection line being activated, and turning on the third transfer gate in response to the column selection line being deactivated; and
latching the first data in the latch circuit by turning on the second transfer gate or turning on the third transfer gate.

19. The operating method of claim 18, wherein the storing of the first data includes discharging the input terminal of the latch circuit to a ground voltage, when the first data to be stored in the latch circuit is 0.

20. The operating method of claim 18, wherein the storing of the first data includes charging the input terminal of the latch circuit to a power supply voltage, when the first data to be stored in the latch circuit is 1.

* * * * *